United States Patent
Yamasaki et al.

(10) Patent No.: US 7,215,477 B2
(45) Date of Patent: May 8, 2007

(54) ZOOM LENS AND IMAGE DISPLAY APPARATUS INCLUDING THE ZOOM LENS

(75) Inventors: Shinji Yamasaki, Tochigi-ken (JP); Takashi Sudo, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 11/076,535

(22) Filed: Mar. 9, 2005

(65) Prior Publication Data
US 2005/0200967 A1 Sep. 15, 2005

(30) Foreign Application Priority Data
Mar. 10, 2004 (JP) ............................. 2004-067442
Mar. 17, 2004 (JP) ............................. 2004-076473

(51) Int. Cl.
*G02B 15/14* (2006.01)
(52) U.S. Cl. .................. 359/649; 359/650; 359/651; 359/679; 359/680; 359/681; 359/682; 359/683; 359/684; 359/685; 359/686; 359/689; 359/691; 359/708; 359/713; 359/714; 359/715; 359/716; 359/717; 359/740; 359/749; 359/761; 359/770; 353/31; 353/37; 353/101
(58) Field of Classification Search ........ 359/649–651, 359/663, 679–686, 689, 691, 708–717, 740, 359/745–753, 756, 761, 763, 770; 353/31, 353/37, 101
See application file for complete search history.

(56) References Cited

U.S. PATENT DOCUMENTS
5,467,226 A * 11/1995 Watanabe .................. 359/693
5,666,228 A 9/1997 Yamamoto et al.
(Continued)

FOREIGN PATENT DOCUMENTS
JP 9-96759 A 4/1997
(Continued)

OTHER PUBLICATIONS
CODEV: "Prompting Guide," Oct. 1999, ORA, XP-002389737, pp. 94-95.
(Continued)

Primary Examiner—Evelyn A. Lester
(74) Attorney, Agent, or Firm—Morgan & Finnegan, L.L.P.

(57) ABSTRACT

Provided is a projection lens, including: a plurality of moving lens units that move on an optical axis for zooming; and a plurality of plastic lenses containing plastic, in which when a focal distance of an i-th positive lens from a predetermined plane side of N positive lenses of the plurality of plastic lenses is given by fpi, a focal distance of a j-th negative lens from the predetermined plane side of M negative lenses of the plurality of plastic lenses is given by fnj, and fp and fn are defined by $$\frac{1}{fp} = \sum_{i=1}^{N} \frac{1}{fpi}$$

$$\frac{1}{fn} = \sum_{j=1}^{M} \frac{1}{fnj}$$

(N and M each are a natural number, that is, an integer equal to or larger than 1), $-0.56 < fn/fp < -0.05$ is satisfied.

32 Claims, 17 Drawing Sheets

U.S. PATENT DOCUMENTS

| | | | |
|---|---|---|---|
| 5,786,945 A | 7/1998 | Aoki et al. | |
| 5,796,527 A | 8/1998 | Ohtake et al. | |
| 6,639,737 B2 * | 10/2003 | Yasui et al. | 359/761 |
| 6,738,196 B2 * | 5/2004 | Yamamoto | 359/680 |
| 6,816,320 B2 * | 11/2004 | Wada | 359/683 |
| 2002/0060858 A1 * | 5/2002 | Wada | 359/739 |
| 2003/0103268 A1 | 6/2003 | Nishikawa et al. | |
| 2004/0012860 A1 | 1/2004 | Wada | |

FOREIGN PATENT DOCUMENTS

| | | |
|---|---|---|
| JP | 9-96759 A5 | 4/1997 |
| JP | 10-48513 A | 2/1998 |
| JP | 11-72703 A | 3/1999 |
| JP | 2001-66499 A | 3/2001 |
| JP | 2001-108900 A | 4/2001 |
| JP | 2001-235679 A | 8/2001 |
| JP | 2002-357769 A | 12/2002 |
| JP | 2002-365537 A | 12/2002 |
| JP | 2003-15037 A | 1/2003 |
| JP | 2003-15038 A | 1/2003 |
| JP | 2003-50352 A | 2/2003 |

OTHER PUBLICATIONS

Patent Abstracts of Japan, vol. 009, No. 040 (P-336), Feb. 20, 1985 (abstract of JP 59 181314 A (Konishiroku), Oct. 15, 1984).

Patent Abstracts of Japan, vol. 007, No. 023 (P-171), Jan. 29, 1983 (abstract of JP 57 176015 A (Nihon Kougaku), Oct. 29, 1982).

* cited by examiner

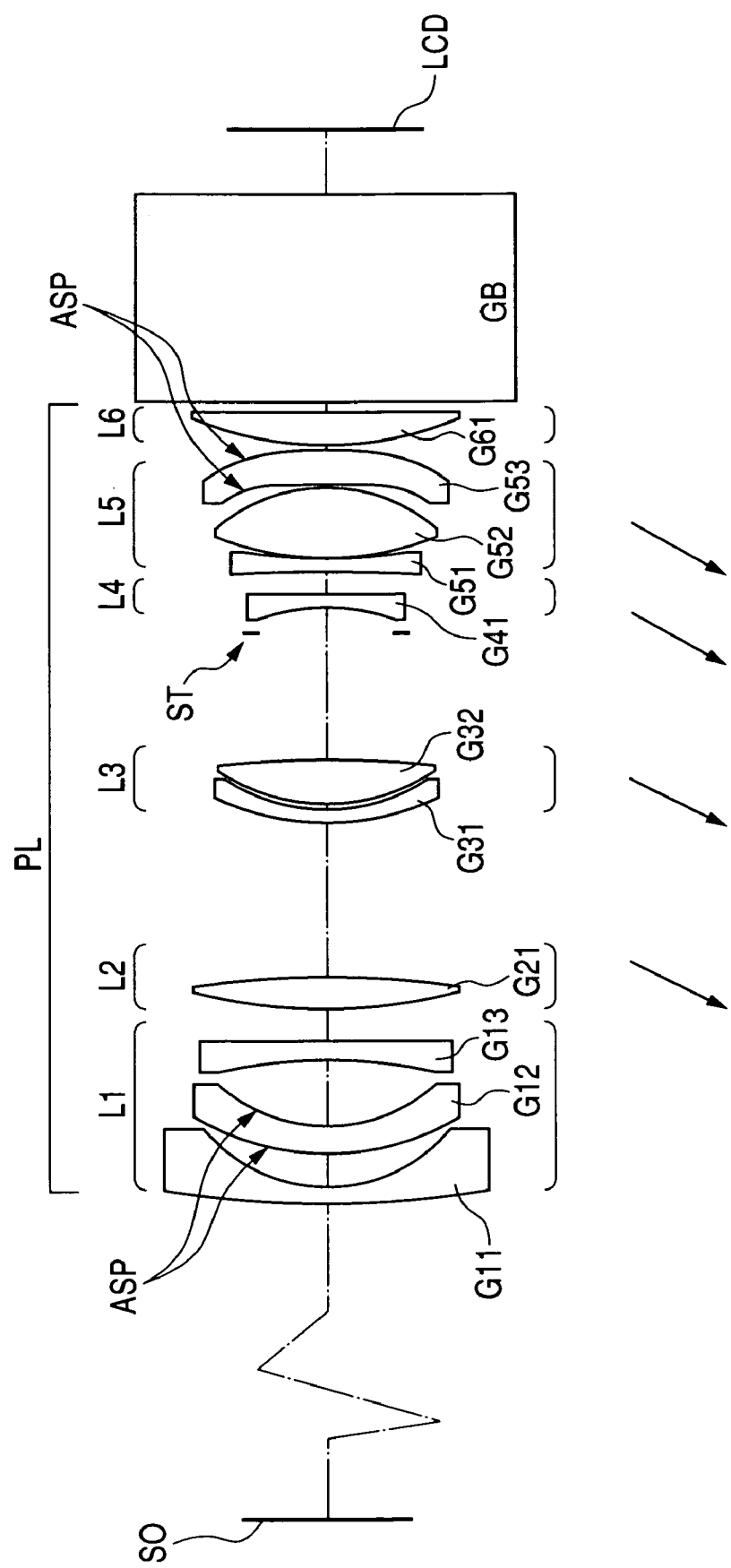

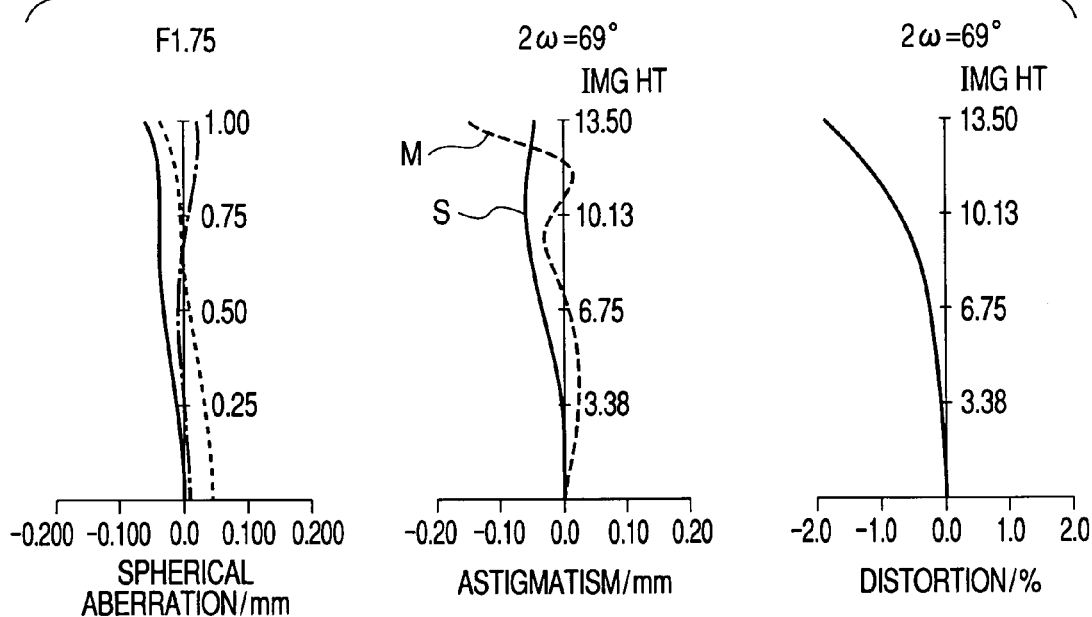
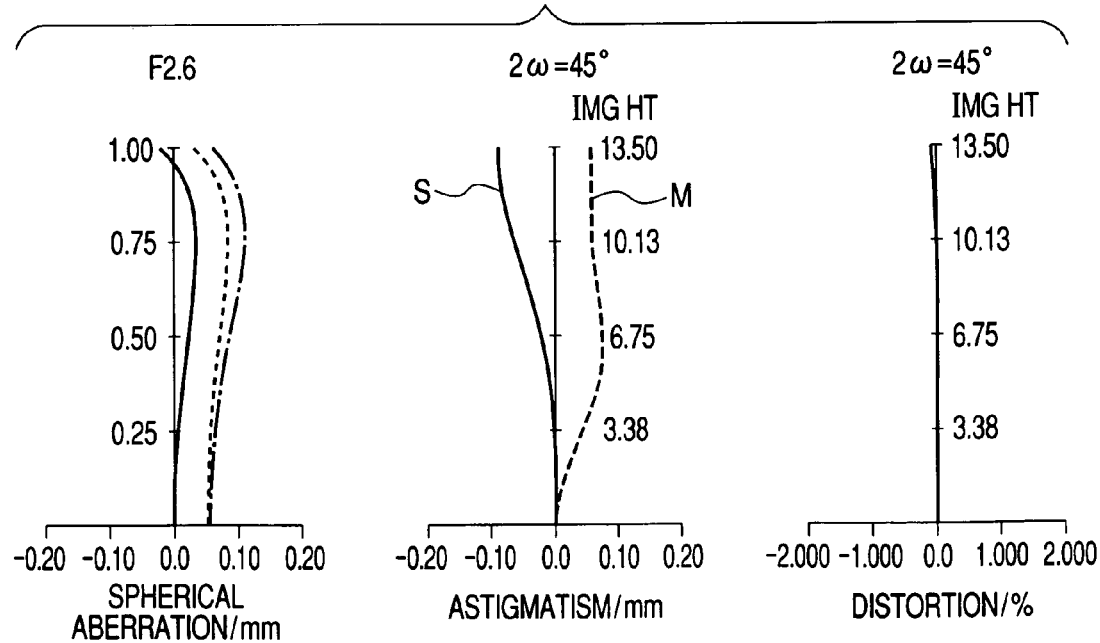

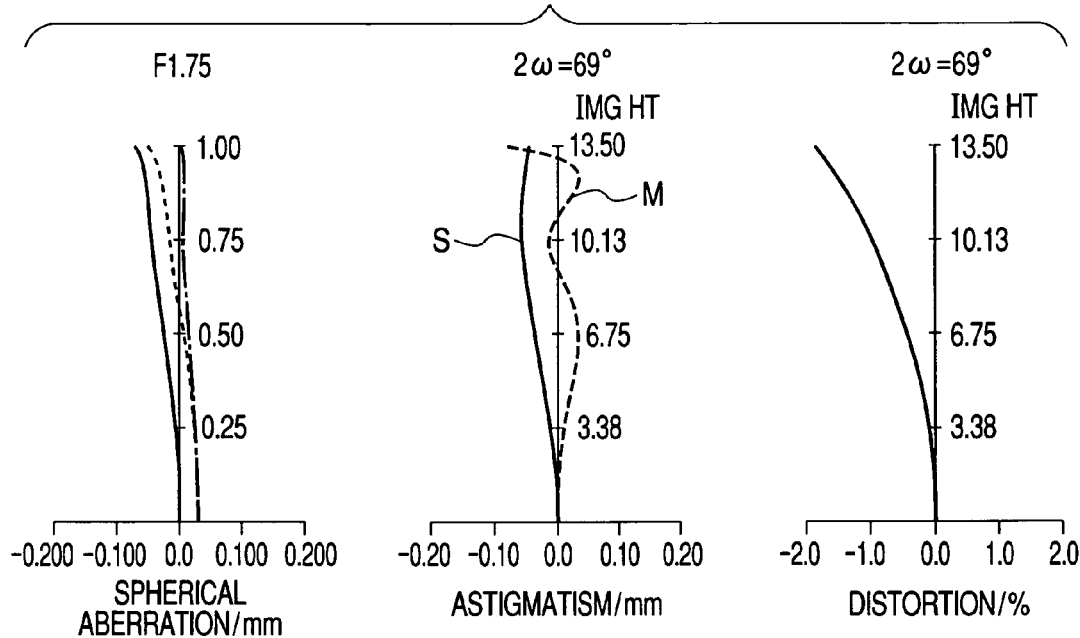
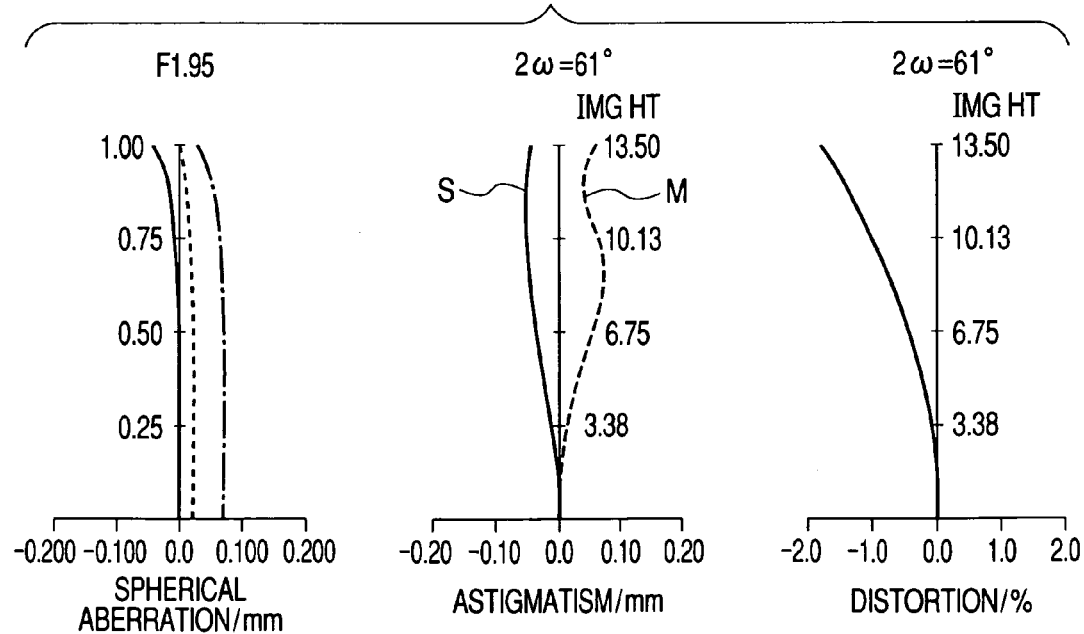

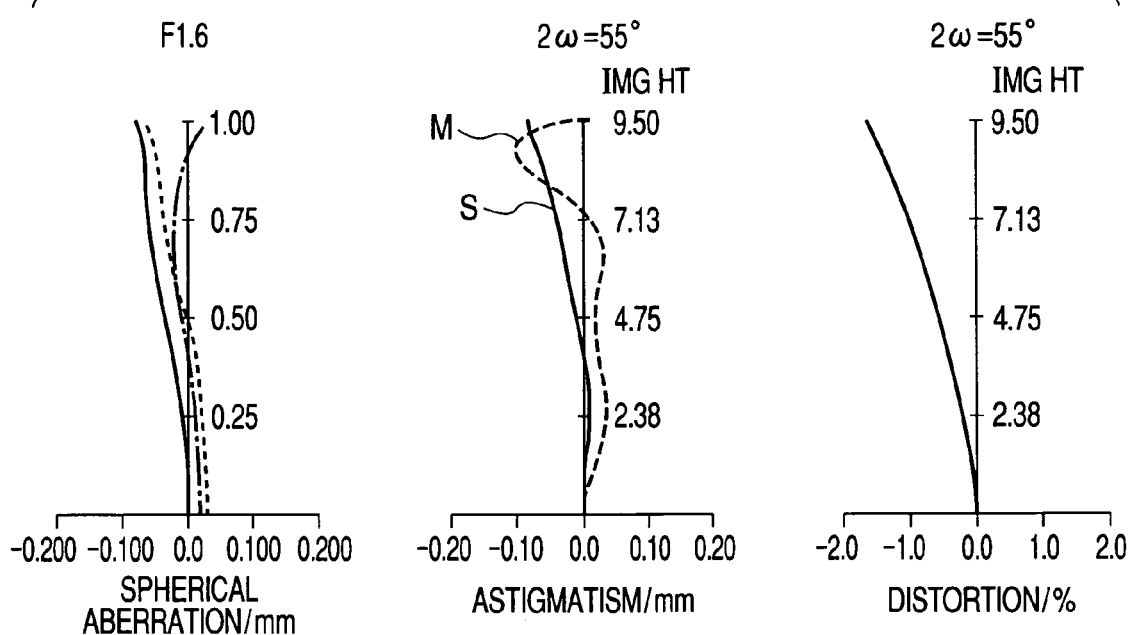
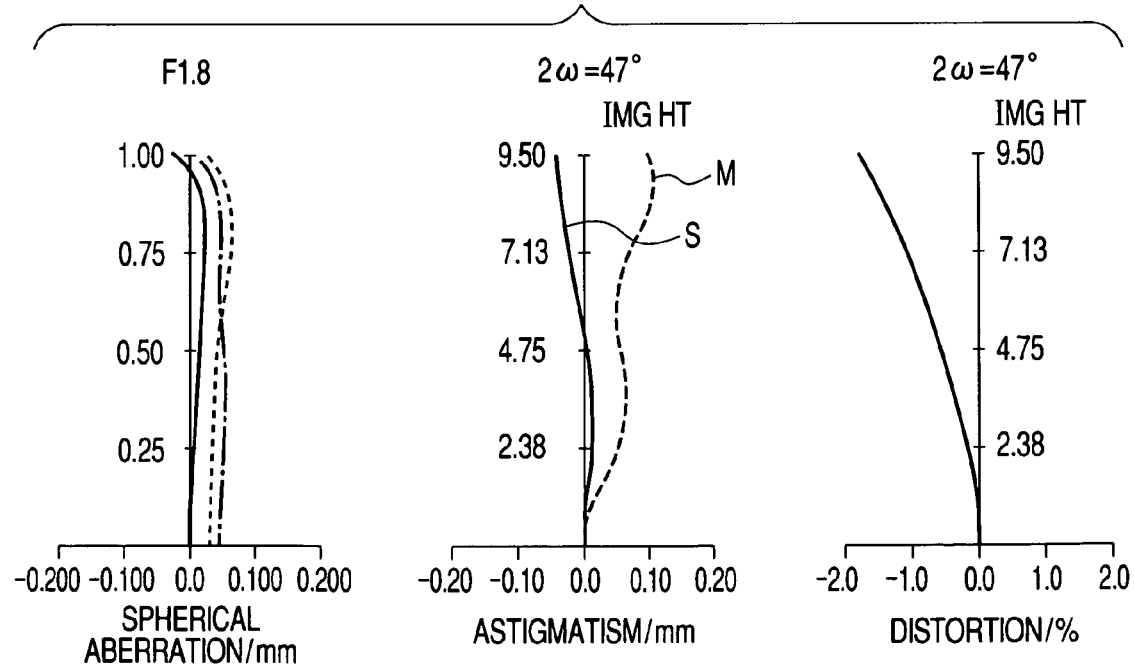

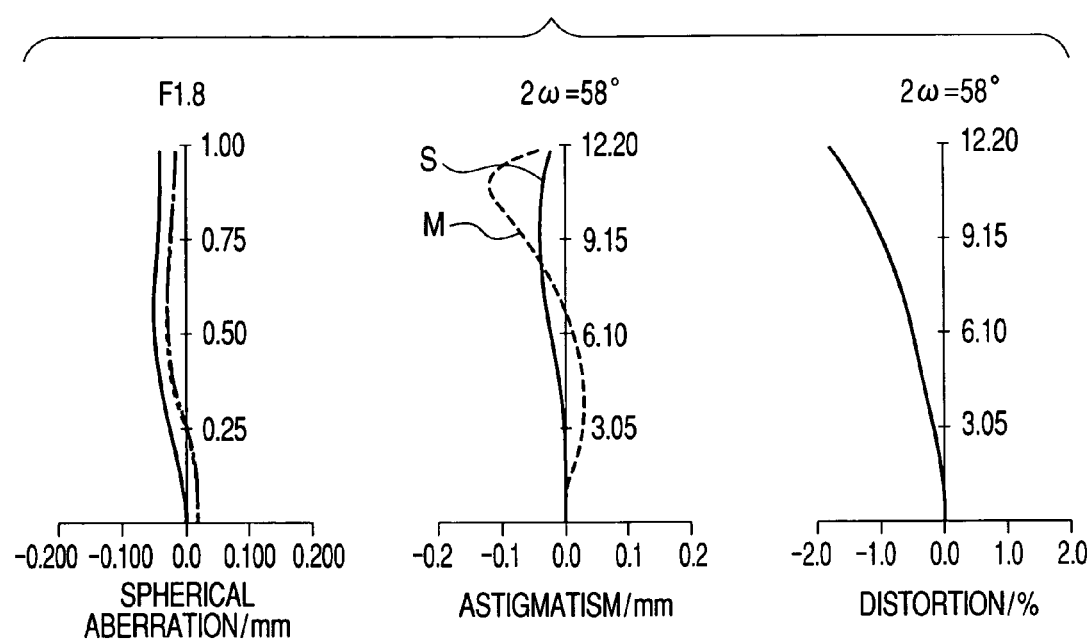
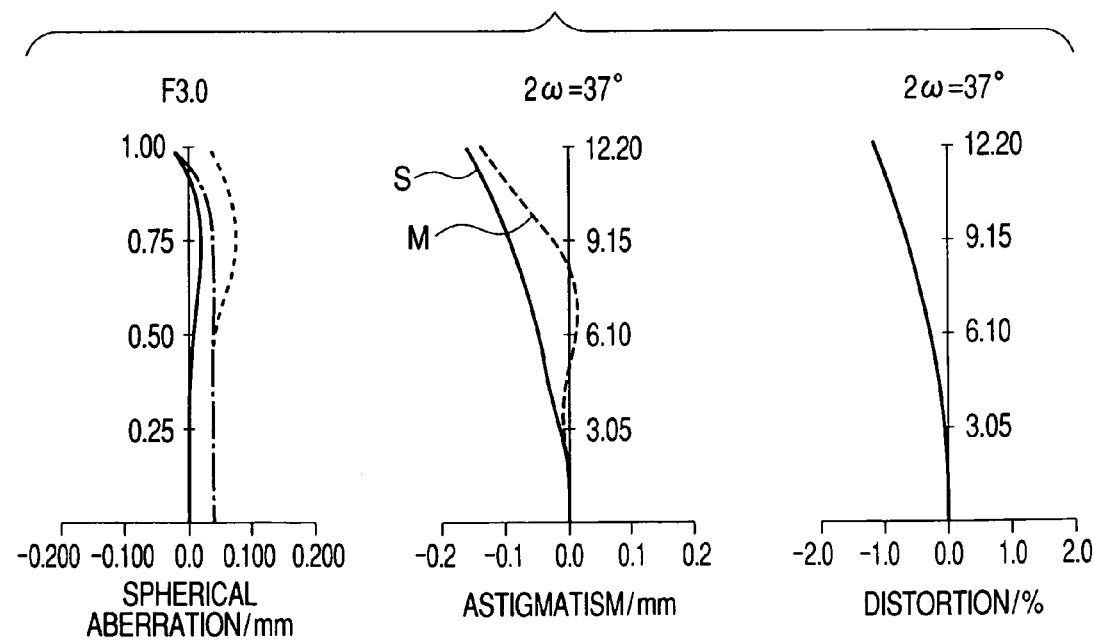

ZOOM LENS AND IMAGE DISPLAY APPARATUS INCLUDING THE ZOOM LENS

BACKGROUND OF THE INVENTION

1. Field of the Invention

The present invention relates to a projection lens (a zoom lens) used for projection, image taking, or the like, and an image display (projection) apparatus using the zoom lens, and an image pickup device using the zoom lens, which are suitable for, for example, a liquid crystal projector, a digital camera, and the like.

2. Related Background Art

Up to now, there have been proposed various liquid crystal projectors (image projection apparatuses) using an image display device such as a liquid crystal display device, which project an image displayed on the image display device to a screen surface.

In particular, the liquid crystal projectors have been widely used for a meeting, a presentation, or the like as an apparatus capable of projecting an image displayed on a display device of a personal computer or the like to a large screen. Recently, a small-size liquid crystal projector for home theater has been put into wide spread use. With this spread, a size of the liquid crystal display device is reducing.

In a three-plate color liquid crystal projector using three liquid crystal display devices, light from a white light source is separated into color light beams of red light, green light, and blue light by a color separation means. The separated color light beams are guided to the corresponding liquid crystal display devices. The color light beams modulated by the liquid crystal display devices are synthesized with one another by a color composition means which is composed of a dichroic prism, a polarizing plate, and the like and guided to a projection lens. Therefore, it is necessary to secure a space in which the optical elements composing the color composition means are disposed between the liquid crystal display device and the projection lens. Thus, a predetermined back focal distance is demanded for the projection lens.

When an incident angle to a color composition film provided in the dichroic prism composing the color composition means changes, a spectral transmittance changes, so, for example, uneven color occurs on a projected image. Therefore, in order to minimize the influence of angular dependence and ensure preferable pupil alignment with an illumination system, it is demanded that a projection optical system used for the color liquid crystal projector be a so-called telecentric optical system in which a pupil on the liquid crystal device (reducing) side is at infinity.

When a picture (image) produced by the color composition of three-color liquid crystal display devices is to be projected to a screen, it is necessary to superimpose respective color pixels on one another over the entire screen region. This is to prevent reductions in resolution and quality due to a double image of, for example, a character on the display device of the personal computer. Therefore, it is demanded to preferably correct a color shift (magnification chromatic aberration) caused in the projection lens in a visible light band.

In order to prevent a reduction in viewability of a projected image due to distortion of a contour portion thereof, it is demanded to sufficiently correct distortion. This is because, when a significant change in distortion is left particularly in peripheral and intermediate portions, the image quality undesirably reduces. In addition, in order to take a great deal of light fluxes from a light source means, it is demanded to use a bright lens system having a small F number.

Recently, while there are needs for increases in screen luminance, image resolution, etc., reductions in device size and weight have been strongly demanded for a projector provided with small-size panel in view of mobility. Further there has been demanded a zoom lens which can realize light and large screen projection (high luminance and wide view angle) at a shorter projection distance in a small room and easily adjust a projection screen size.

Up to now, a six-unit zoom lens has been known as the projection lens for liquid crystal projector (for example, JP 2001-108900 A). The six-unit zoom lens includes six lens units which are a lens unit having negative refracting power, a lens unit having positive refracting power, a lens unit having positive refracting power, a lens unit having negative refracting power, a lens unit having positive refracting power, and a lens unit having positive refracting power, which are disposed in order from a magnifying side (front side). Zooming is performed by suitably moving predetermined lens units of the six lens units.

In addition to the above-mentioned zoom lens, a five-unit zoom lens has been known as the projection lens for liquid crystal projector (for example, JP 2001-066499 A). The five-unit zoom lens includes five lens units which are a lens unit having negative refracting power, a lens unit having positive refracting power, a lens unit having negative refracting power, a lens unit having positive refracting power, and a lens unit having positive refracting power, which are disposed in order from the magnifying side. Zooming is performed by suitably moving predetermined lens units of the five lens units.

An aspherical lens has been used to correct aberration without an increase in the number of lenses in a zoom lens. In addition, an aspherical lens made of a plastic material has been used from the viewpoints of ease of processing and a manufacturing cost.

For example, there has been known the following zoom lens (for example, JP 2003-050352 A). The zoom lens includes three lens units which are a lens unit having negative refracting power, a lens unit having positive refracting power, and a lens unit having positive refracting power, which are disposed in order from an object side. The aspherical lens made of a plastic material is used for each of the lens units.

As compared with the case of an aspherical lens made of a glass material, the aspherical lens made of the plastic material has merits in that it is easy to manufacture, a large aspherical amount is easily obtained, and the aberration of an optical system can be easily corrected.

However, when there is a change in environment, for example, when there is a change in temperature, a refraction index of a material, a thickness thereof, a surface shape thereof, and the like significantly change. Therefore, an optical characteristic may be significantly changed to vary, for example, a focal point.

For example, when a lens made of a plastic material is used for the zoom lens for liquid crystal projector, respective lenses composing the zoom lens are heated due to a set temperature environment, heating of an illumination lamp, or the like. In particular, a refraction index of a material of a plastic lens is significantly changed by heat. Therefore, the amount of variation in focal point increases with a reduction in optical characteristic.

SUMMARY OF THE INVENTION

An object of the present invention is to provide a zoom lens capable of suppressing a change in optical characteristic such as a variation in focal point due to a change in temperature or the like even when an aspherical lens made of a plastic material is used for preferable aberration correction, and an image projection apparatus including the zoom lens.

According to one aspect of the present invention, there is provided a projection lens, including:

a plurality of plastic lenses containing plastic, in which when a focal distance of an i-th positive lens from a predetermined plane side of N positive lenses of the plurality of plastic lenses is given by fpi, a focal distance of a j-th negative lens from the predetermined plane side of M negative lenses of the plurality of plastic lenses is given by fnj, and fp and fn are defined by $$\frac{1}{fp} = \sum_{i=1}^{N} \frac{1}{fpi}$$

$$\frac{1}{fn} = \sum_{j=1}^{M} \frac{1}{fnj}$$

(N and M each are a natural number, that is, an integer equal to or larger than 1), $-0.56 < fn/fp < -0.05$ is satisfied.

According to another aspect of the present invention, there is provided an image display apparatus, including:

a plurality of image display devices;

an illumination optical system for illuminating the plurality of image display devices with light from a light source;

a color composition system for synthesizing light beams from the plurality of image display devices; and the projection lens for projecting light from the color composition system onto the predetermined plane, according to the present invention.

According to another aspect of the present invention, there is provided an optical device, including:

the projection lens according to the present invention.

BRIEF DESCRIPTION OF THE DRAWINGS

FIG. 1 is a main part schematic view showing an image projection apparatus using a zoom lens according to Embodiment 1 of the present invention;

FIGS. 4A and 4B are aberration graphs of the zoom lens at the object distance of 1.7 m when the zoom lens is expressed by the millimeter in Numerical Embodiment 2 corresponding to Embodiment 2 of the present invention;

FIGS. 6A and 6B are aberration graphs of the zoom lens at the object distance of 1.7 m when the zoom lens is expressed by the millimeter in Numerical Embodiment 3 corresponding to Embodiment 3 of the present invention;

FIGS. 10A and 10B are aberration graphs of the zoom lens at the object distance of 2.3 m when the zoom lens is expressed by the millimeter in Numerical Embodiment 5 corresponding to Embodiment 5 of the present invention;

FIGS. 17A and 17B are aberration graphs in a state that focusing is achieved at a focal distance of 2.1 m in Embodiment 6, in which FIG. 17A shows longitudinal aberration including spherical aberration, field curvature, and astigmatism in the case of a focal distance at a wide angle end and FIG. 17B shows longitudinal aberration including spherical aberration, field curvature, and astigmatism in the case of a focal distance at a telephoto end;

FIGS. 18A and 18B are aberration graphs in a state that focusing is achieved at a focal distance of 2.1 m in Embodiment 7, in which FIG. 18A shows longitudinal aberration including spherical aberration, field curvature, and astigmatism in the case of the focal distance at the wide angle end and FIG. 18B shows longitudinal aberration including spherical aberration, field curvature, and astigmatism in the case of a focal distance at the telephoto end;

FIGS. 19A and 19B are aberration graphs in a state that focusing is achieved at a focal distance of 2.1 m in Embodiment 8, in which FIG. 19A shows longitudinal aberration including spherical aberration, field curvature, and astigmatism in the case of a focal distance at the wide angle end and FIG. 19B shows longitudinal aberration including spherical aberration, field curvature, and astigmatism in the case of a focal distance at the telephoto end; and FIGS. 20A and 20B are aberration graphs in a state that focusing is achieved at a focal distance of 2.1 m in Embodiment 9, in which FIG. 20A shows longitudinal aberration including spherical aberration, field curvature, and astigmatism in the case of a focal distance at the wide angle end and FIG. 20B shows longitudinal aberration including spherical aberration, field curvature, and astigmatism in the case of a focal distance at the telephoto end.

DESCRIPTION OF THE PREFERRED EMBODIMENTS

Hereinafter, a zoom lens according to an embodiment mode of the present invention will be described with reference to the drawings.

Figure 2A:
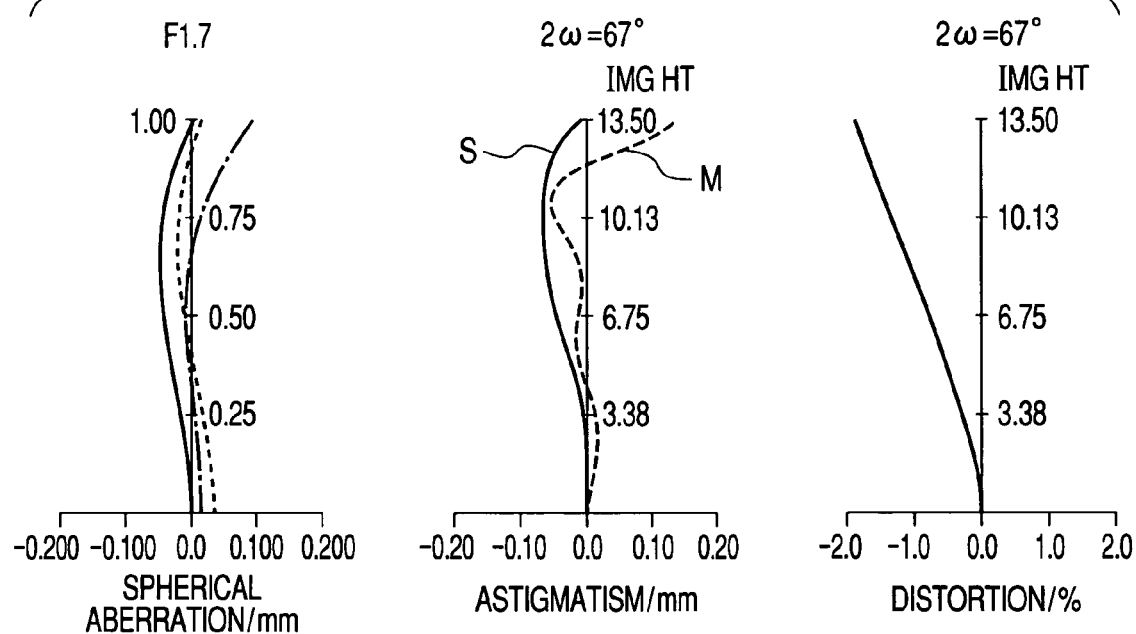
FIGS. 2A and 2B are aberration graphs of the zoom lens at an object distance of 1.7 m when the zoom lens is expressed by the millimeter in Numerical Embodiment 1 corresponding to Embodiment 1 of the present invention.
Figure 2B:
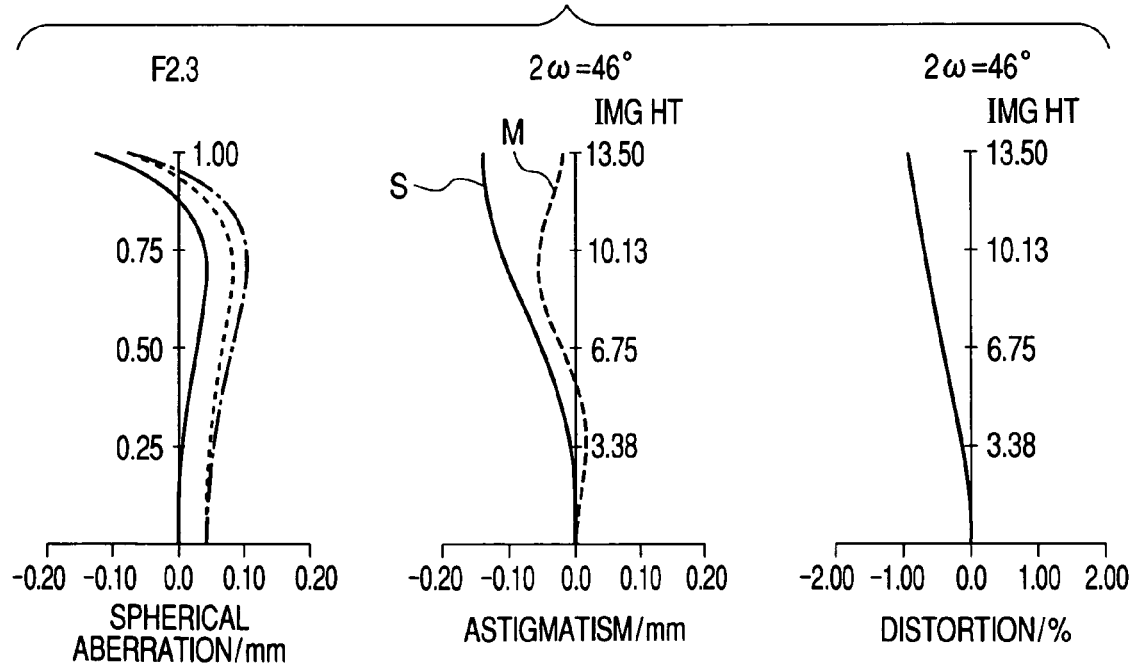

FIG. 1 is a main part schematic view showing an image projection apparatus (liquid crystal video projector) using a zoom lens according to Embodiment 1 of the present invention. FIGS. 2A and 2B are aberration graphs of the zoom lens in zoom positions at a wide angle end (short focal distance end) and a telephoto end (long focal distance end) when an object distance (distance from a first lens unit) is 1.7 m in the case where numerical values are expressed by the millimeter in Numerical Embodiment 1 (described later) corresponding to Embodiment 1 of the present invention.

Figure 3:
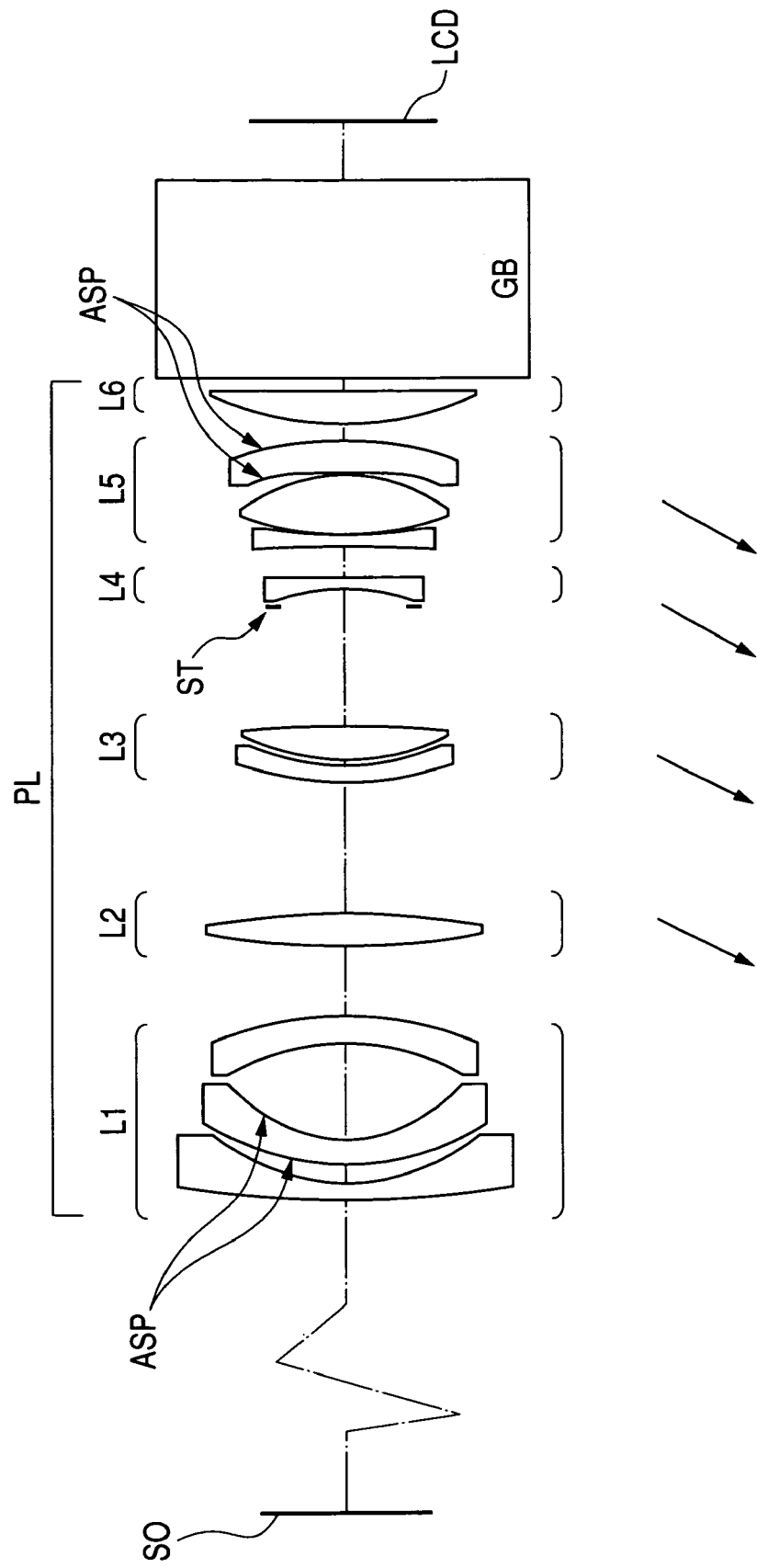
FIG. 3 is a main part schematic view showing an image projection apparatus using a zoom lens according to Embodiment 2 of the present invention.

FIG. 3 is a main part schematic view showing an image projection apparatus (liquid crystal video projector) using a zoom lens according to Embodiment 2 of the present invention. FIGS. 4A and 4B are aberration graphs of the zoom lens in zoom positions at the wide angle end (short focal distance end) and the telephoto end (long focal distance end) when the object distance (distance from the first lens unit) is 1.7 m in the case where numerical values are expressed by the millimeter in Numerical Embodiment 2 (described later) corresponding to Embodiment 2 of the present invention.

Figure 5:
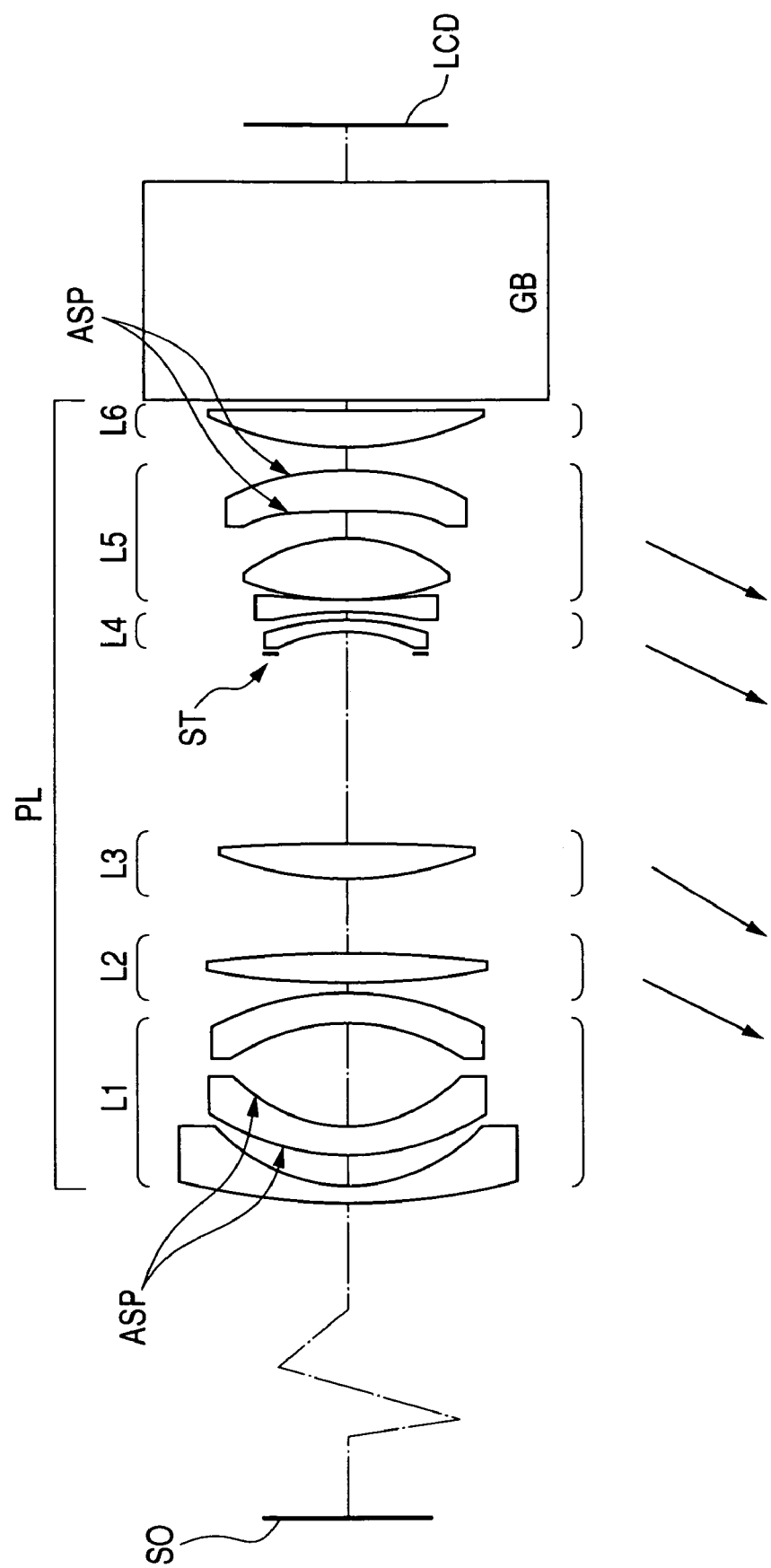
FIG. 5 is a main part schematic view showing an image projection apparatus using a zoom lens according to Embodiment 3 of the present invention.

FIG. 5 is a main part schematic view showing an image projection apparatus (liquid crystal video projector) using a zoom lens according to Embodiment 3 of the present invention. FIGS. 6A and 6B are aberration graphs of the zoom lens in zoom positions at the wide angle end (short focal distance end) and the telephoto end (long focal distance end) when the object distance (distance from the first lens unit) is 1.7 m in the case where numerical values are expressed by the millimeter in Numerical Embodiment 3 (described later) corresponding to Embodiment 3 of the present invention.

Figure 7:
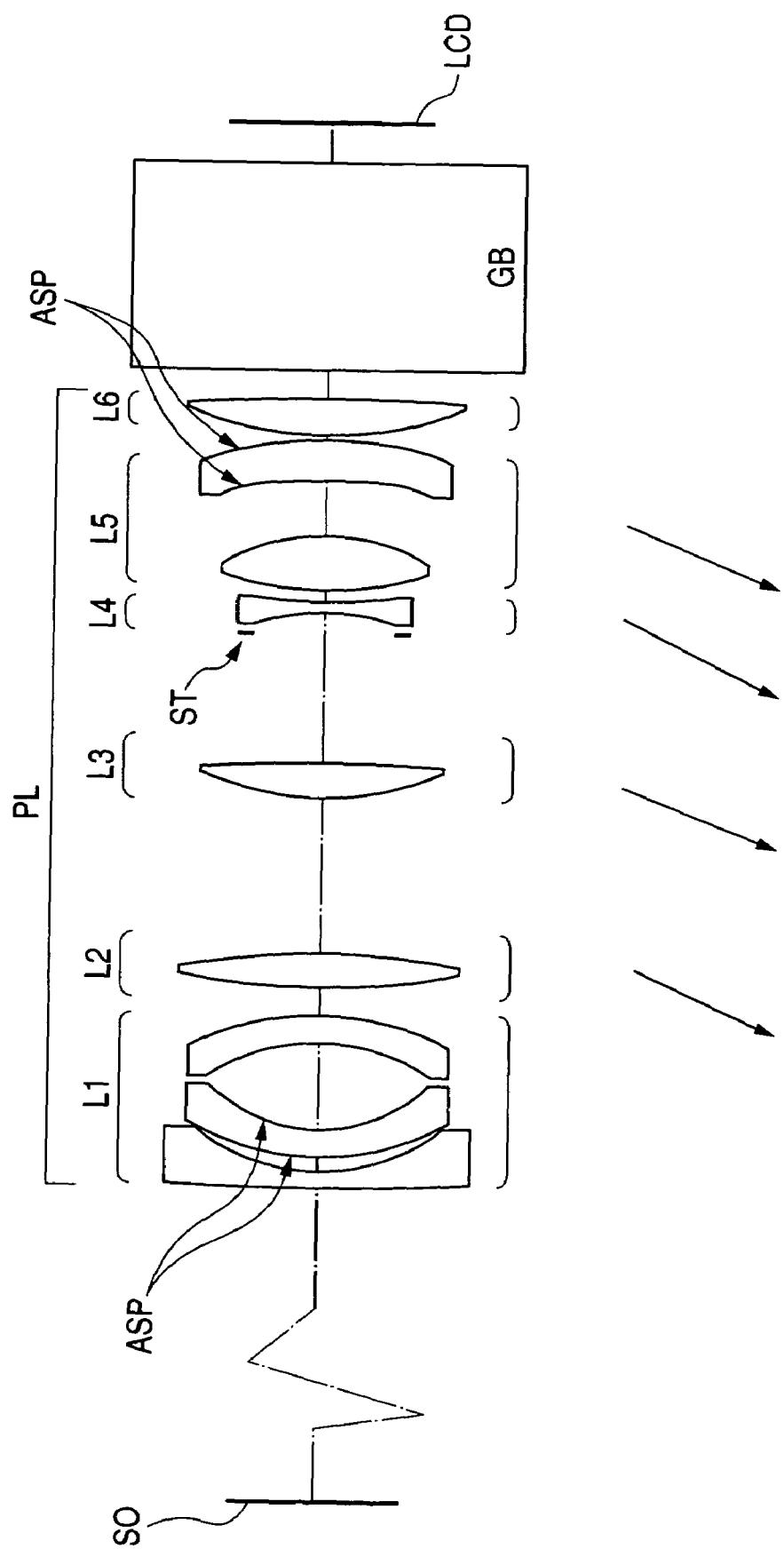
FIG. 7 is a main part schematic view showing an image projection apparatus using a zoom lens according to Embodiment 4 of the present invention.
Figure 8A:
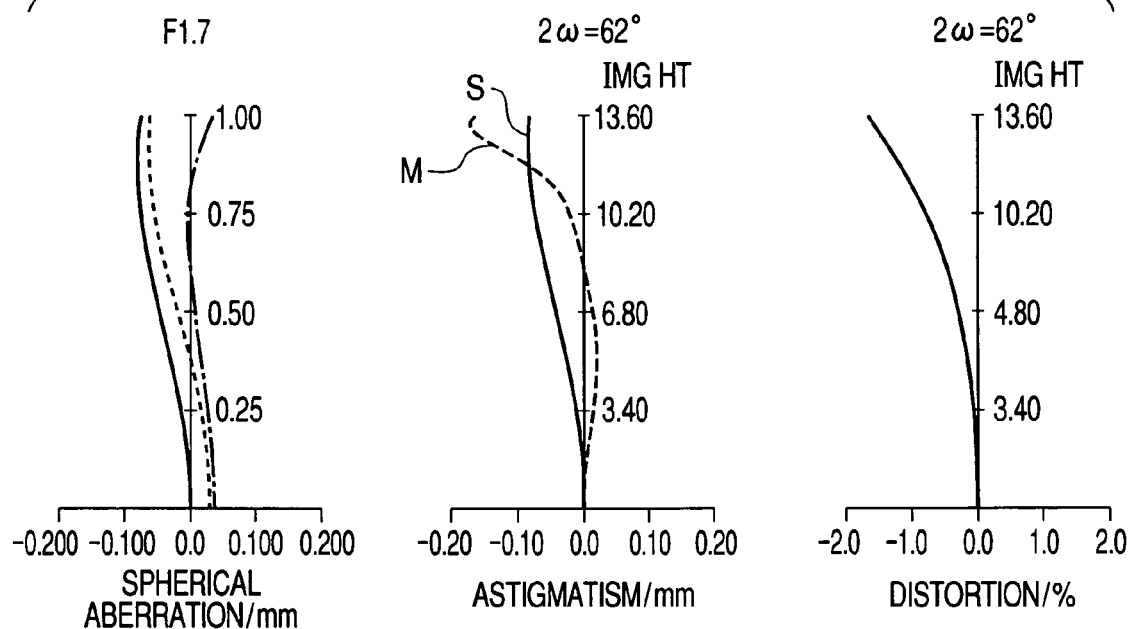
FIGS. 8A and 8B are aberration graphs of the zoom lens at the object distance of 1.7 m when the zoom lens is expressed by the millimeter in Numerical Embodiment 4 corresponding to Embodiment 4 of the present invention.
Figure 8B:
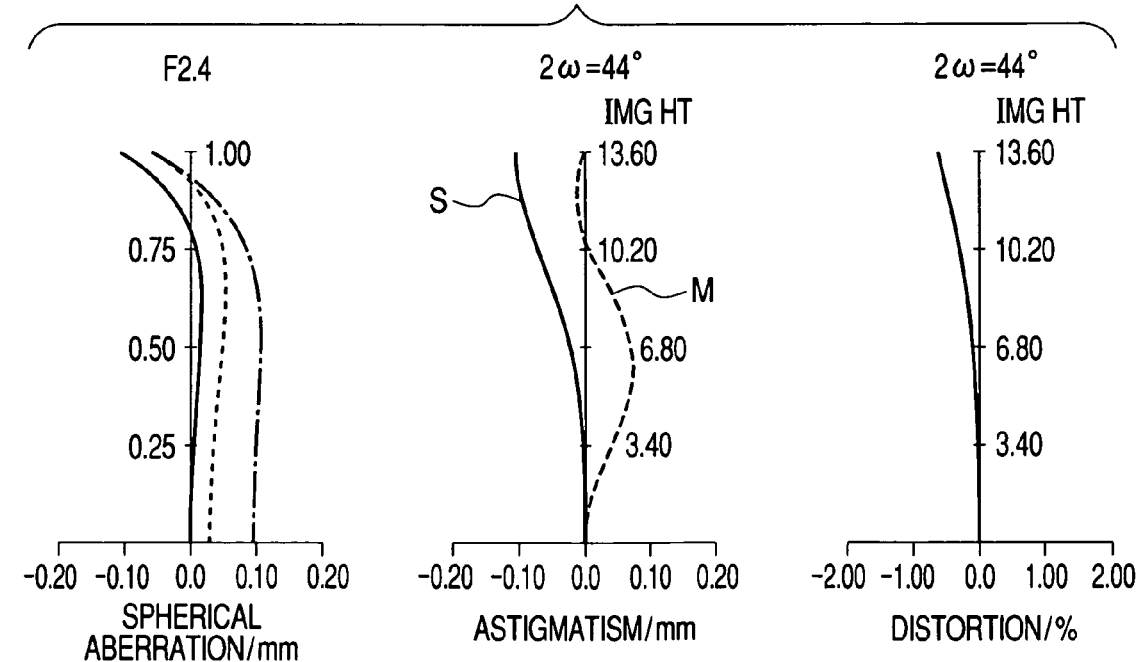

FIG. 7 is a main part schematic view showing an image projection apparatus (liquid crystal video projector) using a zoom lens according to Embodiment 4 of the present invention. FIGS. 8A and 8B are aberration graphs of the zoom lens in zoom positions at the wide angle end (short focal distance end) and the telephoto end (long focal distance end) when the object distance (distance from the first lens unit) is 1.7 m in the case where numerical values are expressed by the millimeter in Numerical Embodiment 4 (described later) corresponding to Embodiment 4 of the present invention.

Figure 9:
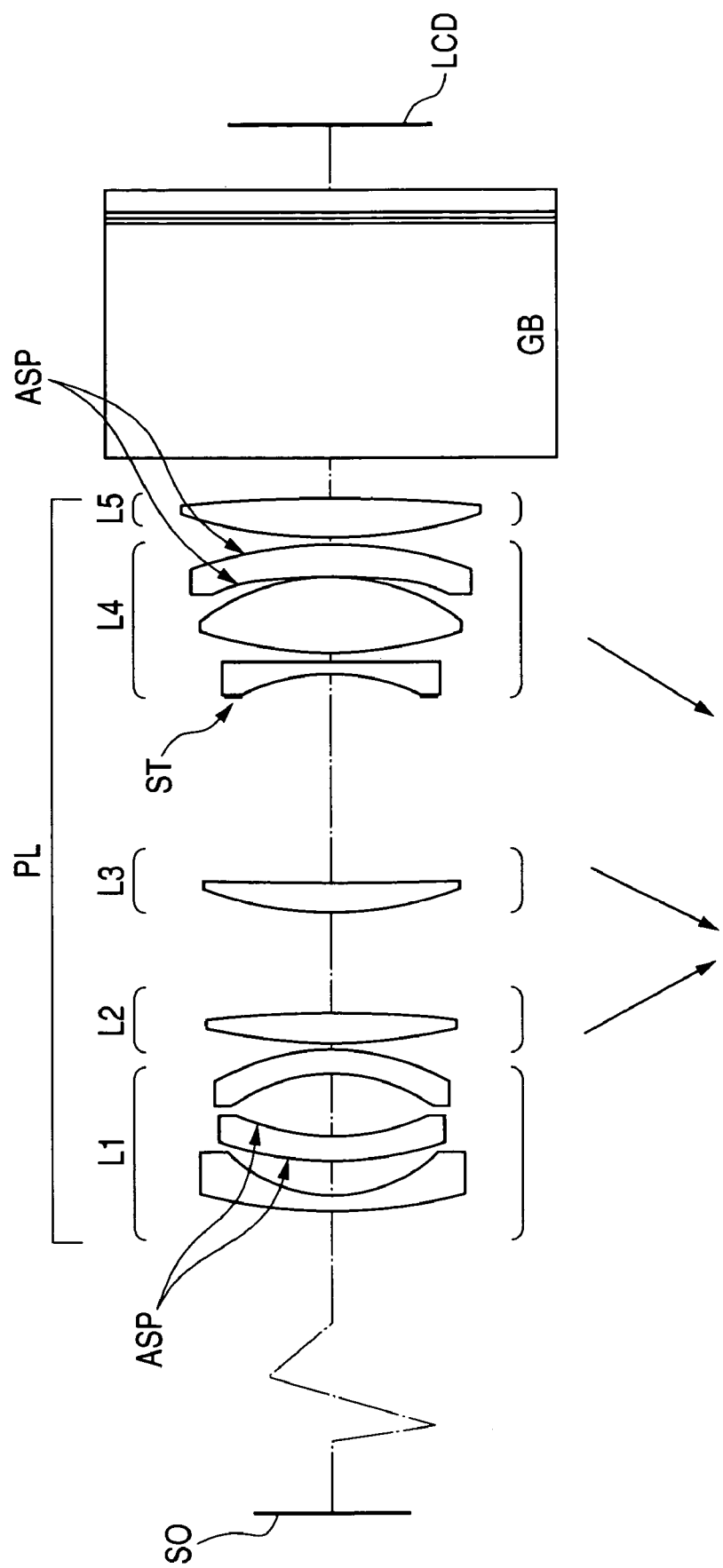
FIG. 9 is a main part schematic view showing an image projection apparatus using a zoom lens according to Embodiment 5 of the present invention.

FIG. 9 is a main part schematic view showing an image projection apparatus (liquid crystal video projector) using a zoom lens according to Embodiment 5 of the present invention. FIGS. 10A and 10B are aberration graphs of the zoom lens in zoom positions at the wide angle end (short focal distance end) and the telephoto end (long focal distance end) when the object distance (distance from the first lens unit) is 2.3 m in the case where numerical values are expressed by the millimeter in Numerical Embodiment 5 (described later) corresponding to Embodiment 5 of the present invention.

In the image projection apparatuses according to Embodiments 1 to 5 as shown in FIGS. 1, 3, 5, 7, and 9, an original image (image to be projected) displayed on a liquid crystal panel LCD or the like is projected under magnification onto a screen surface SO using a zoom lens (projection lens) PL.

Reference symbol SO denotes the screen surface (projection surface) and LCD denotes the liquid crystal panel (liquid crystal display device) that displays the original image (image to be projected). The screen surface SO and the original image displayed on the liquid crystal panel LCD are conjugate with each other. In general, the screen surface SO is a conjugate point with a long distance and located on a magnifying conjugate side (front side). The original image displayed on the liquid crystal panel LCD is a conjugate point with a short distance and located on a reducing conjugate side (rear side).

Reference symbol GB denotes a glass block such as a color composition prism, a polarizing filter, or a color filter.

The zoom lens PL is mounted in a liquid crystal video projector main body (not shown) through a connection member (not shown). The liquid crystal display device LCD and the like that follow the glass block GB are included in the liquid crystal video projector main body.

In Embodiments 1 to 4 as shown in FIGS. 1, 3, 5, and 7, reference symbol L1 denotes a first lens unit having negative refracting power, L2 denotes a second lens unit having positive refracting power, L3 denotes a third lens unit having positive refracting power, L4 denotes a fourth lens unit having negative refracting power, L5 denotes a fifth lens unit having positive refracting power, and L6 denotes a sixth lens unit having positive refracting power. A stop ST is provided between the third lens unit L3 and the fourth lens unit L4. Reference symbol ASP denotes an aspherical surface.

In Embodiments 1 to 4, when zooming from the wide angle end to the telephoto end is to be performed, the second lens unit L2, the third lens unit L3, the fourth lens unit L4, and the fifth lens unit L5 are separately moved to the screen surface SO as indicated by arrows.

The first lens unit L1 and the sixth lens unit L6 are not moved for zooming. Therefore, the entire length from the first lens unit to the sixth lens unit in zooming is constant. Focusing is performed by moving the first lens unit L1 on an optical axis. Note that focusing may be performed by moving the liquid crystal panel LCD.

In Embodiment 5 as shown in FIG. 9, reference symbol L1 denotes the first lens unit having negative refracting power, L2 denotes the second lens unit having positive refracting power, L3 denotes the third lens unit having positive refracting power, L4 denotes the fourth lens unit having positive refracting power, and L5 denotes the fifth lens unit having positive refracting power. The stop ST is provided between the third lens unit L3 and the fourth lens unit L4. Reference symbol ASP denotes an aspherical surface.

In Embodiment 5, when zooming from the wide angle end to the telephoto end is to be performed, as indicated by the arrows, the second lens unit L2 is moved to the liquid crystal panel LCD (reducing conjugate) side. The third lens unit L3 and the fourth lens unit L4 are moved to the screen surface SO (magnifying conjugate) side. The first lens unit L1 and the fifth lens unit L5 are not moved for zooming.

Therefore, the entire length from the first lens unit to the fifth lens unit in zooming is constant. Focusing is performed by moving the first lens unit L1 on the optical axis. Note that focusing may be performed by moving the liquid crystal panel LCD.

In the above-mentioned embodiments, the surfaces of the respective lenses are subjected to multilayer coating, so a reduction in illuminance on the screen surface SO is prevented.

In the aberration graphs shown in FIGS. 2, 4, 6, 8, and 10, reference symbol G indicates aberration at a wavelength of 550 nm, R indicates aberration at a wavelength of 620 nm, and B indicates aberration at a wavelength of 450 nm. Each of reference symbols S (tilt of a sagittal image plane) and M (tilt of a meridional image plane) indicates aberration at a wavelength of 550 nm. Reference symbol ω denotes a view angle and F denotes an F number.

Next, the features in Embodiments 1 to 5 will be described. In the respective embodiments, a zoom lens includes:

N (N is an integer equal to or larger than 1, that is, a natural number) lenses, each of which is made of a plastic material, and has positive refracting power and has front (magnifying conjugate side) surface or/and rear (reducing conjugate side) surface of an aspherical shape; and M (M is an integer equal to or larger than 1, that is, a natural number) lenses, each of which is made of a plastic material, and has negative refracting power and has front surface or/and rear surface of an aspherical shape, in which in the case where a focal distance fpi of each of the lenses each having the positive refracting power and a focal distance fni of each of the lenses each having the negative refracting power are defined by the following relationships, $$\frac{1}{fp} = \sum_{i=1}^{N} \frac{1}{fpi}$$

$$\frac{1}{fn} = \sum_{j=1}^{M} \frac{1}{fnj}$$

(N and M each are a natural number, that is, an integer equal to or larger than 1)

$$-0.56 < fn/fp < -0.05 \quad (1)$$

is satisfied.

The conditional expression (1) relates to a lens LN which is made of a plastic material and has negative refracting power and a lens LP which is made of a plastic material and has positive refracting power. The lens LN has an aspherical shape effective to correct aberration and the lens LP has an aspherical shape for correcting aberration. In addition, the conditional expression (1) specifies a relationship between the power (refracting power) of the lens LN and the power of the lens LP. Here, although a phrase "made of a plastic material i.e., that is approximately 100% plastic material is used, each of the lenses is not necessarily made of only plastic. At 20 degrees centigrade, 50% or more (more preferably 80% or more) of a lens material may be made of plastic. This point is applicable to all embodiments described below. The expression limited to the aspherical lens is used here. However, the present invention is not limited to the aspherical lens and thus can be applied to a spherical lens, a plane-convex lens, or a plane-concave lens. The present invention can be also applied to all optical elements having optical power, such as a lens having a focal point, a cylindrical lens, and a toric lens. If possible, it is preferable that at least one of the (N+M) plastic lenses be an aspherical lens. In particular, it is preferable that a negative lens have an aspherical surface. It is more desirable that the negative lens having the aspherical surface be disposed in the first lens unit (lens unit located closest to the magnifying conjugate side).

The optical element which is called the lens is not necessarily limited to a refraction type optical element and thus may be a diffraction type optical element. A reflection type optical element may be used instead of the lens.

In general, with respect to the lens LP, a focal position on the reducing conjugate side is shifted in the over-direction with a change in refraction index of a material thereof due to an increase in temperature. With respect to the lens LN, a focal position on the reducing conjugate side is shifted in the under direction with a change in refraction index of a material thereof due to an increase in temperature. Therefore, when both the lenses are used, the shift directions of the focal position are paired, with the result that focal shift due to a change in temperature can be suppressed.

In a range lower than the lower limit of the conditional expression (1), the positive refracting power becomes excessively larger than the negative refracting power. Therefore, the influence of the lens LP due to a change in temperature significantly occurs, so the focal point is excessively shifted in the over direction.

In a range which exceeds the upper limit of the conditional expression (1), the negative refracting power becomes excessively larger than the positive refracting power. Therefore, the influence of the lens LN due to a change in temperature significantly occurs, so the focal point is excessively shifted in the under direction.

With respect to the conditional expression (1), it is more preferable to satisfy $$-0.52 < fn/fp \quad (1a)$$

and/or $$fn/fp < -0.12 \quad (1b)$$

It is more desirable to satisfy $$fn/fp < -0.28 \quad (1c)$$

When the zoom lens includes a plastic lens in addition to the N plastic lenses each having the positive refracting power and the M plastic lenses each having the negative refracting power, which are specified with respect to the refracting power, the plastic lens may cause focal shift by a change in environment such as a temperature. Therefore, it is preferable that the number of plastic lenses (lens containing a plastic material) of the zoom lens be set to (N+M). In other words, it is desirable that a plastic lens other than the (N+M) plastic lenses be not provided in the zoom lens. Of course, an optical element having no optical power (such as refracting power) does not significantly influence the focal shift, so the zoom lens may include a plastic lens other than the (N+M) plastic lenses.

At least one lens having negative refracting power is included in the first lens unit located closest to the front side.

In the respective embodiments, plastic is used as a material of the lens which is included in the first lens unit L1, whose surface has the aspherical shape, and which has the negative refracting power. The aberration is effectively corrected by using the lens which has the negative refracting power and is made of the plastic material in the first lens unit L1 that requires negative strong refracting power which is a feature of a wide angle type (retrofocus type) lens system having a long back focus. Here, the back focus indicates a distance between an apex of the surface of a lens of the zoom lens which is closest to the reducing conjugate side and a position of an image plane on the reducing conjugate side (that is, a position at which an image forming device that forms an original image, such as a liquid crystal panel is disposed in the case of a projector).

An aperture of the first lens unit L1 becomes larger than that of other lens units, so an intensity of a projection light beam reduces. With this reduction, an aspherical shape capable of suitably correcting the light beam is easy to set. Therefore, in the respective embodiments, a load on the other lenses, which is caused by aberration correction reduces and a reduction in the number of lenses is effectively achieved.

When a focal distance of the entire system in a zoom position at the wide angle end is given by fw, $$-7 < fn/fw < -1 \qquad (2)$$

is satisfied.

The constitutional expression (2) is a conditional expression for suitably regulating the refracting power of the lens LN which is made of the plastic material, whose surface has the aspherical shape, and which has the negative refracting power with respect to the focal distance of the entire lens system. In a range lower than the lower limit of the conditional expression (2), the refracting power of the lens LN reduces. Therefore, for example, in the case of a structure including a front unit having negative strong refracting power, which is specific to a retrofocus type, the action of the aspherical surface of the lens LN is insufficient. In a range which exceeds the upper limit of the conditional expression (2), the negative refracting power of the lens LN becomes too strong. Therefore, the eccentric sensitivity becomes too high, with the result that it is hard to perform the adjustment for offering the performance of the entire lens system.

More preferably, numerical ranges of the conditional expression (2) are set as follows.

$$-5 < fn/fw \qquad (2a)$$

and/or $$fn/fw < -2 \qquad (2b)$$

The first lens unit located closest to the magnifying conjugate side is composed of only the lenses each having the negative refracting power. Of the lenses, a lens located closest to the reducing conjugate side is formed in a meniscus shape in which the surface thereof on the magnifying conjugate side is concave or the surface thereof on the reducing conjugate side is convex.

In the respective embodiments, a lens having negative refracting power (preferably a lens having at least one aspherical shape) is used as each of the lenses in the first lens unit L1. In addition, the first lens unit L1 includes the lens having the meniscus shape in which the surface thereof on the magnifying conjugate side is concave or the surface thereof on the reducing conjugate side is convex. Therefore, aberration reverse to distortion and astigmatism which are caused by the lens whose surface on the magnifying conjugate side is convex is caused to correct distortion and astigmatism caused in the first lens unit L1 using a small number of lenses. Further, an effective diameter of a front lens is reduced.

When an average value of Abbe numbers of materials of the lenses each having the negative refracting power in the first lens unit is given by ν1n, $$47 < \nu 1n \qquad (3)$$

is satisfied.

The conditional expression (3) is a conditional expression for reducing magnification chromatic aberration caused in the first lens unit L1. A material having small chromatic dispersion is used as a material of each of the lenses having the negative refracting power in the first lens unit L1 to reduce the magnification chromatic aberration. A range lower than the lower limit of the conditional expression (3) is not preferable because the magnification chromatic aberration becomes larger.

It is more preferable that the numerical value of the conditional expression (3) be set as follows $$48 < \nu 1n \qquad (3a)$$

In is more desirable to satisfy $$50 < \nu 1n \qquad (3b)$$

Here, ν1n is set to preferably 70 or less, more preferably 60 or less. In addition, ν1n may be set to a value larger than 51.

The zoom lens in this embodiment mode is a zoom lens which includes five optical components (lens units, each of which may be composed of one or plural lenses or composed of a diffraction optical element or a mirror in addition to the lens) and moves at least two of the five optical elements in an optical direction in power changing from the wide angle end to the telephoto end. With respect to the feature of the zoom lens, of the five optical elements, a first optical element located closest to the magnifying conjugate side has the negative optical power. The first optical element is held during zooming from the wide angle end to the telephoto end. When a focal distance at the wide angle end is given by fw and an air conversion length of the back focus is given by bf, $$0.25 < fw/bf < 0.60 \qquad (4)$$

is satisfied. More preferably, $$0.40 < fw/bf < 0.60 \qquad (4a)$$

is satisfied.

The conditional expression (4) indicates a condition for suitably obtaining a long back focus. When fw/bf exceeds the upper limit, the back focus shortens. Therefore, it is hard to obtain a back focus necessary to insert a prism or the like. Conversely, when fw/bf becomes lower than the lower limit, although the long back focus is obtained, the entire lens length lengthens. Here, it is more preferable that the first lens unit have bonded lenses. According to such a structure, the magnification chromatic aberration can be effectively suppressed.

When the third of the five optical elements which is counted from the magnifying conjugate side is referred to as a third optical element, the third optical element may be composed of two lenses, that is, a meniscus lens and a biconvex lens, which are disposed in order from the magnifying conjugate side. The meniscus lens is disposed convex to the magnifying conjugate side and has negative optical power. Therefore, a variation in magnification chromatic aberration during power changing is suppressed.

When the fifth of the five optical elements which is counted from the magnifying conjugate side is referred to as a fifth optical element, the fifth optical element may be composed of a cemented lens, a biconvex lens, and a positive meniscus lens, which are disposed in order from the magnifying conjugate side. In the cemented lens, a lens having negative optical power is bonded to a lens which is disposed closer to the reducing conjugate side than the lens having negative optical power and has positive optical power. The meniscus lens is disposed convex to the reducing conjugate side. Therefore, the fifth optical lens has a function for providing telecentric property on an image plane (liquid crystal display device) while the magnification chromatic aberration is suppressed.

Reference symbol GB denotes a glass block such as a dichroic prism for color composition, LCD denotes the liquid crystal display device, and ST denotes the stop.

Next, the features of the respective embodiments will be described.

(Embodiment 1)

As shown in FIG. 1, in Embodiment 1, the first lens unit L1 includes a lens G11 having negative refracting power, a lens G12 having negative refracting power, and a lens G13, which are disposed in order from the magnifying conjugate side to the reducing conjugate side. The lens G11 is formed in a meniscus shape in which the surface thereof on the magnifying conjugate side is convex. The lens G12 is formed in the meniscus shape in which the surface thereof on the magnifying conjugate side is convex. Each of the surfaces of the lens G13 on the magnifying conjugate side and the reducing conjugate side is concave.

The lens G12 is made of a plastic material and each of the surfaces thereof on the magnifying conjugate side and the reducing conjugate side has an aspherical shape. When each of the surfaces of the lens G12 on the magnifying conjugate side and the reducing conjugate side is formed in the aspherical shape, the distortion is mainly corrected.

The distortion and the astigmatism are corrected by the surface of the lens G13 on the reducing conjugate side. Low dispersion glass (Abbe number is equal to larger than 54) is used as a material of each of the lenses in the first lens unit L1 to suppress the occurrence of magnification chromatic aberration.

The second lens unit L2 includes a lens G21. Each of the surfaces of the lens G21 on the magnifying conjugate side and the reducing conjugate side is convex, so various aberrations caused in the first lens unit L1 are mainly corrected. A glass material having a high refraction index (equal to or larger than 1.75) is used for the lens G21. Therefore, the Petzval sum is reduced to suppress variations in various aberrations including spherical aberration in zooming.

The Petzval sum is reduced to reduce a field curvature and astigmatism at an intermediate image height, with the result that high resolving power is obtained. In view of the correction of chromatic aberration, glass having a high refraction index and low dispersion property is used to efficiently correct the magnification chromatic aberration caused in the first lens unit L1.

The third lens unit L3 includes two lenses, that is, a lens G31 having negative refracting power and a lens G32. The lens G31 is formed in the meniscus shape in which the surface thereof on the magnifying conjugate side is convex. Each of the surfaces of the lens G32 on the magnifying conjugate side and the reducing conjugate side is convex. The lens G32 has a main power changing function. When the third lens unit L3 is composed of the two lenses having the negative and positive refracting powers, although the third lens unit L3 has a large aperture, a variation in magnification chromatic aberration is suppressed in a power changing range.

Coma flare and on-axis chromatic aberration are preferably corrected. Note that the stop ST is disposed in the third lens unit L3. In zooming, the diagram ST is moved together with the third lens unit L3. Therefore, a variation in off-axis aberration in zooming is suppressed.

The fourth lens unit L4 includes a lens G41 whose surface on the magnifying conjugate side is concave. The lens G41 is provided with negative strong refracting power to correct a displacement of a focal plane due to power changing. Therefore, the lens G41 having the negative strong refracting power is disposed to efficiently reduce the Petzval sum.

The fifth lens unit L5 includes a lens G51, a lens G52, and a lens G53 having positive refracting power. Each of the surfaces of the lens G51 on the magnifying conjugate side and the reducing conjugate side is concave. Each of the surfaces of the lens G52 on the magnifying conjugate side and the reducing conjugate side is convex. The lens G53 is formed in the meniscus shape in which the surface thereof on the reducing conjugate side is convex.

The lens G51 having negative strong refracting power is disposed closest to the magnifying conjugate side (screen side) to efficiently reduce the Petzval sum. In addition, a position of a rear side principal point is controlled to ensure preferable telecentric property, thereby obtaining a back focus which is a necessary length.

With respect to the lens G52, low dispersion glass is used to reduce chromatic aberration. Plastic is used as a material of the lens G53 located closest to the reducing conjugate side. Each of the surfaces of the lens G53 on the magnifying conjugate side and the reducing conjugate side is formed in an aspherical shape. Off-axis aberration such as astigmatism is efficiently corrected by the lens G53.

The sixth lens unit L6 includes a lens G61 whose surface on the magnifying conjugate side is convex and which has positive refracting power. The lens G61 is used to preferably maintain the telecentric property.

In Embodiment 1, the lens G12 having negative refracting power and the lens G53 having positive refracting power each are made of the plastic material and each have at least one aspherical surface. However, the present invention is not limited to this. Each of a plurality of lenses may be made of a plastic material and provided with at least one aspherical surface, so a variation in optical performance, such as focal shift due to a change in environment, may be corrected. A material of a lens having an aspherical shape is not limited to plastic and may be glass. A so-called hybrid type lens in which a thin resin layer is formed on the surface thereof to obtain an aspherical shape may be used.

According to the zoom lens in Embodiment 1, a high-power variable projection lens which has a small F number of 1.7, which can project a 100-inch image at a short distance of about 2.5 m, and which has a zoom magnification of about 1.6 is realized.

(Embodiment 2)

In Embodiment 2 as shown in FIG. 3, the first lens unit L1 includes three lenses G11, G12, and G13. Of those lenses, the lenses G11 and G12 are identical to those in Embodiment 1.

A lens G13 is a lens which has negative refracting power and is formed in a meniscus shape in which the surface thereof on the reducing conjugate side is convex. The distortion and the astigmatism are corrected by forming the lens G13 in the meniscus shape.

The second to sixth lens units L2 to L6 are identical to those in Embodiment 1.

According to the zoom lens in Embodiment 2, a high-power variable projection lens which has a small F number of 1.75, which can project a 100-inch image at a short distance of about 2.4 m, and which has a zoom magnification of about 1.7 is realized.

(Embodiment 3)

In Embodiment 3 as shown in FIG. 5, the first lens unit L1 and the second lens unit L2 are identical to those in Embodiment 2.

The third lens unit L3 includes a lens G31. Each of the surfaces of the lens G31 on the magnifying conjugate side and the reducing conjugate side is convex. The lens G31 is provided with power (refracting power) to serve as a main variable lens unit. The stop ST is disposed in the third lens unit L3. In zooming, the diagram ST is moved together with the third lens unit L3. Therefore, a variation in off-axis aberration in zooming is suppressed.

The fourth lens unit L4 includes a lens G41 having negative refracting power. The lens G41 is formed in the meniscus shape in which the surface thereof on the magnifying conjugate side is concave. The lens G41 is provided with negative strong refracting power to correct a displacement of a focal plane due to power changing. Therefore, the lens G41 having the negative strong refracting power is disposed to efficiently reduce the Petzval sum.

The fifth and sixth lens units L5 and L6 are identical to those in Embodiment 1.

According to the zoom lens in Embodiment 3, a projection lens which has a small F number of 1.75 and can project a 100-inch image at a short distance of about 2.4 m is realized.

(Embodiment 4)

In Embodiment 4 as shown in FIG. 7, the first, second, and third lens units L1, L2, and L3 are identical to those in Embodiment 3.

The fourth lens unit L4 includes a lens G41 having negative refracting power. Each of the surfaces of the lens G41 on the magnifying conjugate side and the reducing conjugate side is concave. The lens G41 is provided with negative strong refracting power to correct a displacement of a focal plane due to power changing. Therefore, the lens G41 having the negative strong refracting power is disposed to efficiently reduce the Petzval sum. In addition, a position of a rear side principal point is controlled to ensure preferable telecentric property, thereby obtaining a back focus which is a necessary length.

The fifth lens unit L5 includes a lens G51 having positive refracting power and a lens G52 having positive refracting power. Each of the surfaces of the lens G51 on the magnifying conjugate side and the reducing conjugate side is convex. The lens G52 is formed in the meniscus shape in which the surface thereof on the reducing conjugate side is convex. Low dispersion glass (for example, SFSL5 or SFPL51, manufactured by Ohara Incorporated) is used for the lens G51 to further suppress deterioration in chromatic aberration.

The lens G52 is made of a plastic material. Each of the surfaces of the lens G52 on the magnifying conjugate side and the reducing conjugate side is formed in an aspherical shape. Off-axis aberration such as astigmatism is efficiently corrected by the lens G52.

The sixth lens unit is identical to that in Embodiment 1. According to the zoom lens in Embodiment 4, a high-power variable projection lens which has a small F number of 1.7, which can project a 100-inch image at a short distance of about 2.8 m, and which has a zoom magnification of about 1.5 is realized.

(Embodiment 5)

In Embodiment 5 as shown in FIG. 9, which is different from Embodiments 1 to 4, a zoom lens includes five lens groups. In Embodiment 5, the first and second lens units L1 and L2 are identical to those in Embodiment 3.

The third lens unit L3 includes a lens G31 having positive refracting power. The lens G31 is formed in the meniscus shape in which the surface thereof on the magnifying conjugate side is convex. The lens G31 is provided with strong power to serve as a main variable lens unit. The stop ST is disposed in the third lens unit L3. In zooming, the diagram ST is moved together with the third lens unit L3. Therefore, a variation in off-axis aberration in zooming is suppressed.

The fourth lens unit L4 includes a lens G41 having negative refracting power, a lens G42 having positive refracting power, and a lens G43 having positive refracting power. Each of the surfaces of the lens G41 on the magnifying conjugate side and the reducing conjugate side is concave. Each of the surfaces of the lens G42 on the magnifying conjugate side and the reducing conjugate side is convex. The lens G43 is formed in the meniscus shape in which the surface thereof on the reducing conjugate side is convex.

The lens G41 having negative strong refracting power is disposed closest to the magnifying conjugate side to efficiently reduce the Petzval sum. In addition, a position of a rear side principal point is controlled to ensure preferable telecentric property, thereby obtaining a back focus which is a necessary length. Low dispersion glass is used as a material of the lens G42 to reduce chromatic aberration.

The lens G43 located closest to the reducing conjugate side is made of a plastic material. Each of the surfaces of the lens G43 on the magnifying conjugate side and the reducing conjugate side is formed in an aspherical shape. Off-axis aberration such as astigmatism is efficiently corrected by the lens G43. The fifth lens unit L5 includes a lens G51 whose surfaces on the magnifying conjugate side and the reducing conjugate side each are convex and which has positive refracting power. The lens G51 is used to preferably maintain the telecentric property.

In Embodiment 5, the lens G12 having negative refracting power and the lens G43 having positive refracting power each are made of the plastic material and each have at least one aspherical surface. However, the present invention is not limited to this. Each of a plurality of lenses may be made of a plastic material and provided with at least one aspherical surface, so a variation in optical performance, such as focal shift due to a change in environment, may be corrected.

A material of a lens having an aspherical shape is not limited to plastic and may be glass. A so-called hybrid type lens in which a thin resin layer is formed on the surface thereof to obtain an aspherical shape may be used.

According to the zoom lens in Embodiment 5, a projection lens which has a small F number of 1.6 and can project a 100-inch image at a short distance of about 3.3 m is realized.

As described above, according to the respective embodiments, it is possible to realize a zoom lens in which an aperture is large, telecentric property on the reducing conjugate side is preferable, resolution is high, distortion is low, magnification chromatic aberration is preferably corrected in a wide visible light range, and a back focus is long.

Hereinafter, Numerical Embodiments 1 to 5 corresponding to numerical data of the zoom lenses according to Embodiments 1 to 5 will be described. In the respective numerical embodiments, "i" denotes an order of an optical surface which is counted from the magnifying conjugate side (front side), Ri denotes a curvature radius of an i-th optical surface (i-th surface), di denotes an interval between the i-th surface and an (i+1)-th surface, Ni denotes a refractive index of a material of an i-th optical member based on a d-line, and vi denotes an Abbe number of the material of the i-th optical member based on the d-line. In addition, f denotes a focal distance and Fno denotes an F number.

Two surfaces closest to the reducing conjugate side in Numerical Embodiments 1 to 4 and five surfaces closest to the reducing conjugate side in Numerical Embodiment 5 each are the surface composing the glass block GB corresponding to a color composition prism, a face plate, various filters, or the like.

When a conic constant is given by k, aspherical coefficients are given by A, B, C, D, and E, and a displacement from a surface apex in an optical direction at a height h from an optical axis is given by x, an aspherical shape is expressed by the following expression $$x = \frac{(1/r)h^2}{1 + \sqrt{\{1 - (1+k)(h/r)^2\}}} + Ah^4 + Bh^6 + Ch^8 + Dh^{10} + Eh^{12}$$

Here, r denotes a paraxial curvature radius. Note that, for example, "e-Z" indicates "$10^{-Z}$".

Relationships between the above-mentioned respective conditional expressions (1) to (3) and various numerical values in Numerical Embodiments 1 to 5 are shown in Table 1.

TABLE 1

| Conditional Expression | Example | | | | |
|---|---|---|---|---|---|
| | 1 | 2 | 3 | 4 | 5 |
| (1) fn/fp | −0.49 | −0.44 | −0.39 | −0.32 | −0.51 |
| (2) fn/fw | −4.23 | −3.78 | −3.56 | −3.50 | −4.8 |
| (3) νln | 62.2 | 62.2 | 50.1 | 62.2 | 51.7 |

TABLE 2

Numerical Embodiment 1 f = 20.5–32.0 Fno = 1.7–2.3

| | Ri | di | Ni | νi |
|---|---|---|---|---|
| 1 | 135.52760 | 2.20000 | 1.603112 | 60.6 |
| 2 | 22.20566 | 4.82312 | | |
| 3* | 30.30312 | 3.80123 | 1.529960 | 55.8 |
| 4* | 17.50000 | 9.46981 | | |
| 5 | −75.96001 | 2.60000 | 1.487490 | 70.2 |
| 6 | 1208.49547 | (d6) | | |
| 7 | 77.19455 | 4.35235 | 1.834000 | 37.2 |
| 8 | −131.56200 | (d8) | | |
| 9 | 37.35455 | 1.90000 | 1.805181 | 25.4 |
| 10 | 25.82421 | 0.67242 | | |
| 11 | 26.73313 | 6.26644 | 1.696797 | 55.5 |
| 12 | −148.75753 | 17.87398 | | |
| 13 | Diaphram | (d13) | | |
| 14 | −25.38923 | 1.90000 | 1.834000 | 37.2 |
| 15 | −2398.36883 | (d15) | | |
| 16 | −248.59224 | 1.90000 | 1.805181 | 25.4 |
| 17 | 84.32249 | 0.15000 | | |
| 18 | 42.19698 | 9.89265 | 1.496999 | 81.5 |
| 19 | −23.32016 | 0.58160 | | |
| 20* | −275.04475 | 4.91820 | 1.529960 | 55.8 |
| 21* | −70.43647 | (d21) | | |
| 22 | 49.47900 | 4.54606 | 1.696797 | 55.5 |
| 23 | 2.1+E04 | 1.45000 | | |
| 24 | ∞ | 29.20000 | 1.516330 | 64.1 |
| 25 | ∞ | 9.43898 | | |

Aspherical Data

| | 1/r | K | A | B | C | D | E |
|---|---|---|---|---|---|---|---|
| *3 | 3.29999E−02 | −9.76920E+00 | 2.35014E−05 | −7.33003E−08 | 1.93473E−10 | −3.46177E−13 | 2.92512E−16 |
| *4 | 5.71429E−02 | −4.10696E−01 | −3.57207E−05 | 6.94290E−08 | −4.78851E−10 | 1.20204E−12 | −1.48676E−15 |
| *21 | −3.63577E−03 | 2.38360E+02 | −3.13625E−05 | −7.54875E−08 | 1.12226E−10 | −1.35192E−12 | 4.05599E−15 |
| *22 | −1.41972E−02 | 1.12730E+01 | −1.81511E−05 | −2.83717E−08 | −1.03937E−11 | −1.14346E−13 | 1.24744E−15 |

Interval Data

| | d6 | d8 | d13 | d15 | d21 |
|---|---|---|---|---|---|
| Wide | 4.78312 | 21.87063 | 3.76178 | 3.13662 | 0.70000 |
| Tele | 2.57162 | 0.92000 | 9.71154 | 1.25338 | 19.79559 |

TABLE 3

Numerical Embodiment 2 f = 19.5–32.5 Fno = 1.75–2.6

|  | Ri | di | Ni | vi |
|---|---|---|---|---|
| 1 | 188.33308 | 2.20000 | 1.603112 | 60.6 |
| 2 | 29.22697 | 2.68378 | | |
| 3* | 29.62014 | 3.50000 | 1.529960 | 55.8 |
| 4* | 16.00000 | 14.27669 | | |
| 5 | −32.03003 | 3.85000 | 1.487490 | 70.2 |
| 6 | −47.16182 | (d6) | | |
| 7 | 114.29429 | 4.73649 | 1.834000 | 37.2 |
| 8 | −112.92039 | (d8) | | |
| 9 | 46.10981 | 2.33889 | 1.846658 | 23.9 |
| 10 | 31.62438 | 0.90000 | | |
| 11 | 31.63855 | 4.83048 | 1.696797 | 55.5 |
| 12 | −182.50942 | 17.86499 | | |
| 13 | Diaphram | (d13) | | |
| 14 | −29.32700 | 1.60000 | 1.834000 | 37.2 |
| 15 | −674.04222 | (d15) | | |
| 16 | −140.27192 | 1.38000 | 1.805181 | 25.4 |
| 17 | 67.55669 | 0.15000 | | |
| 18 | 42.54956 | 8.60150 | 1.516330 | 64.1 |
| 19 | −24.69518 | 0.30475 | | |
| 20* | −170.01137 | 4.69894 | 1.529960 | 55.8 |
| 21* | −58.39828 | (d21) | | |
| 22 | 43.33167 | 5.15000 | 1.603112 | 60.6 |
| 23 | −758.56616 | 1.45000 | | |
| 24 | ∞ | 29.20000 | 1.516330 | 64.1 |
| 25 | ∞ | 8.38557 | | |

Aspherical Data

| | 1/r | K | A | B | C | D | E |
|---|---|---|---|---|---|---|---|
| *3 | 3.37608E−02 | −8.22022E+00 | 2.20374E−05 | −6.60972E−08 | 1.64899E−10 | −2.67527E−13 | 1.86593E−16 |
| *4 | 6.25000E−02 | −3.54087E−01 | −3.46047E−05 | 4.00531E−08 | −4.13570E−10 | 1.21407E−12 | −2.17149E−15 |
| *20 | −5.88196E−03 | 1.11477E+02 | −1.50733E−05 | −5.34314E−08 | 1.41621E−10 | −4.19654E−13 | 1.95784E−15 |
| *21 | −1.71238E−02 | 1.02079E+01 | −1.79868E−06 | −2.87323E−08 | 1.83974E−10 | −5.50033E−13 | 2.28359E−15 |

Interval Data

| | d6 | d8 | d13 | d15 | d21 |
|---|---|---|---|---|---|
| Wide | 10.24147 | 19.26262 | 2.25370 | 4.76644 | 2.40927 |
| Tele | 2.23073 | 1.57681 | 13.17683 | 0.81548 | 21.13365 |

TABLE 4

Numerical Example 3 f = 19.5–23.0 Fno = 1.75–1.95

|  | Ri | di | Ni | vi |
|---|---|---|---|---|
| 1 | 86.30617 | 2.20000 | 1.712995 | 53.9 |
| 2 | 22.17785 | 4.26576 | | |
| 3* | 30.84064 | 3.70000 | 1.529960 | 55.8 |
| 4* | 16.10856 | 13.74972 | | |
| 5 | −26.58051 | 4.00000 | 1.581439 | 40.7 |
| 6 | −35.31287 | (d6) | | |
| 7 | 103.03786 | 3.91775 | 1.806098 | 40.9 |
| 8 | −130.93248 | (d8) | | |
| 9 | 45.73313 | 4.56276 | 1.712995 | 53.9 |
| 10 | −266.51474 | 25.80682 | | |
| 11 | Diaphram | (d11) | | |
| 12 | −21.35425 | 1.60000 | 1.755199 | 27.5 |
| 13 | −34.91108 | (d13) | | |
| 14 | −45.60545 | 1.37000 | 1.805181 | 25.4 |
| 15 | 86.42216 | 0.18336 | | |
| 16 | 39.55187 | 8.03548 | 1.487490 | 70.2 |
| 17 | −22.20508 | 3.67399 | | |
| 18* | −103.92841 | 5.20000 | 1.529960 | 55.8 |
| 19* | −50.69899 | (d19) | | |
| 20 | 42.36158 | 5.15000 | 1.696797 | 55.5 |

TABLE 4-continued

Numerical Example 3

| | | | | | | |
|---|---|---|---|---|---|---|
| 21 | −995.34409 | 1.45000 | | | | |
| 22 | ∞ | 29.20000 | 1.516330 | 64.1 | | |
| 23 | ∞ | 7.98690 | | | | |

Aspherical Data

| | 1/r | K | A | B | C | D | E |
|---|---|---|---|---|---|---|---|
| *3 | 3.24247E−02 | −6.56583E+00 | 1.75591E−05 | −4.00306E−08 | 1.53076E−10 | −3.29093E−13 | 2.88627E−16 |
| *4 | 6.20788E−02 | −3.73031E−01 | −3.53337E−05 | 2.16335E−09 | −1.64441E−10 | 4.20592E−13 | −1.23403E−15 |
| *18 | −9.62201E−03 | 2.88249E+01 | −2.57731E−05 | −5.90265E−08 | 7.55012E−12 | −1.08648E−12 | 3.36015E−15 |
| *19 | −1.97243E−02 | 7.36610E+00 | −7.31371E−06 | −2.79471E−08 | 1.55497E−10 | −9.62718E−13 | 3.49872E−15 |

Interval Data

| | d6 | d8 | d11 | d13 | d19 |
|---|---|---|---|---|---|
| Wide | 1.27771 | 10.15204 | 2.85626 | 1.14830 | 2.95005 |
| Tele | 0.9000 | 0.7000 | 5.16290 | 0.48407 | 11.13739 |

TABLE 5

Numerical Embodiment 4

$f = 22.6$–$33.7$ Fno = $1.7$–$2.4$

| | Ri | di | Ni | vi |
|---|---|---|---|---|
| 1 | 592.44314 | 2.20000 | 1.603112 | 60.6 |
| 2 | 25.95271 | 2.00000 | | |
| 3* | 30.77385 | 3.70000 | 1.529960 | 55.8 |
| 4* | 17.03280 | 11.90964 | | |
| 5 | −28.47042 | 3.73691 | 1.487490 | 70.2 |
| 6 | −37.82812 | (d6) | | |
| 7 | 94.50825 | 4.77474 | 1.785896 | 44.2 |
| 8 | −86.45848 | (d8) | | |
| 9 | 37.81112 | 5.01740 | 1.603112 | 60.6 |
| 10 | −245.70261 | 18.06176 | | |
| 11 | Diaphram | (d11) | | |
| 12 | −27.69372 | 1.37000 | 1.846658 | 23.9 |
| 13 | 69.54633 | (d13) | | |
| 14 | 47.40957 | 7.36869 | 1.516330 | 64.1 |
| 15 | −26.92805 | 7.54099 | | |
| 16* | −107.07905 | 5.50000 | 1.529960 | 55.8 |
| 17* | −59.94720 | (d17) | | |
| 18 | 50.84156 | 4.84538 | 1.785896 | 44.2 |
| 19 | −301.91938 | 4.00000 | | |
| 20 | ∞ | 29.20000 | 1.516330 | 64.1 |
| 21 | ∞ | 5.56695 | | |

Aspherical Data

| | 1/r | K | A | B | C | D | E |
|---|---|---|---|---|---|---|---|
| *3 | 3.24951E−02 | −6.36268E+00 | 1.06306E−05 | −2.25168E−09 | −3.53930E−11 | 9.89246E−15 | 1.20527E−16 |
| *4 | 5.87102E−02 | −2.54526E−01 | −3.92262E−05 | 4.60471E−08 | −3.44376E−10 | 5.58932E−13 | −8.19138E−16 |
| *16 | −9.33890E−03 | −1.51141E+01 | −1.41709E−05 | −5.66364E−08 | 1.77083E−10 | −4.45385E−13 | 1.57965E−16 |
| *17 | −1.66813E−02 | 8.94891E+00 | 2.96888E−06 | −4.04405E−08 | 2.68900E−10 | −7.71981E−13 | 1.26532E−15 |

Interval Data

| | d6 | d8 | d11 | d13 | d17 |
|---|---|---|---|---|---|
| Wide | 3.9500 | 21.66253 | 3.08412 | 1.67785 | 0.7000 |
| Tele | 0.7500 | 0.7000 | 9.15737 | 1.0000 | 19.46713 |

TABLE 6

Numerical Embodiment 5 f = 18.3–21.7 Fno = 1.6–1.8

|     | Ri | di | Ni | vi |
|-----|-----|-----|-----|-----|
| 1   | 47.39366 | 1.50000 | 1.658441 | 50.9 |
| 2   | 13.64038 | 3.41855 |  |  |
| 3*  | 30.00000 | 2.40000 | 1.529960 | 55.8 |
| 4*  | 17.83195 | 6.01613 |  |  |
| 5   | −15.57699 | 2.27397 | 1.666718 | 48.3 |
| 6   | −21.27434 | (d6) |  |  |
| 7   | 133.34802 | 2.80664 | 1.806098 | 40.9 |
| 8   | −46.44001 | (d8) |  |  |
| 9   | 31.37923 | 2.90933 | 1.772499 | 49.6 |
| 10  | 241.75195 | 18.55020 |  |  |
| 11  | Diaphram | (d11) |  |  |
| 12  | −19.26847 | 1.10000 | 1.846658 | 23.9 |
| 13  | 896.55906 | 0.94091 |  |  |
| 14  | 40.73860 | 7.31534 | 1.487490 | 70.2 |
| 15  | −20.17264 | 0.15000 |  |  |
| 16* | −45.05576 | 3.00000 | 1.529960 | 55.8 |
| 17* | −31.07916 | (d17) |  |  |
| 18  | 46.69934 | 3.77645 | 1.712995 | 53.9 |
| 19  | −129.98328 | 4.00000 |  |  |
| 20  | ∞ | 23.00000 | 1.516330 | 64.1 |
| 21  | ∞ | 0.44000 | 1.500000 | 65.0 |
| 22  | ∞ | 0.50000 | 1.764000 | 65.0 |
| 23  | ∞ | 2.20000 | 1.460000 | 65.0 |
| 24  | ∞ | 6.58725 |  |  |

Aspherical Data

|     | 1/r | K | A | B | C | D | E |
|-----|-----|-----|-----|-----|-----|-----|-----|
| *3  | 3.33333E−02 | −2.28260E+01 | 4.65998E−05 | −2.24672E−07 | 1.31081E−09 | −5.24990E−12 | 0.00000E+00 |
| *4  | 5.60791E−02 | −5.95633E+00 | 1.58911E−05 | −1.18746E−07 | −1.20000E−09 | 0.00000E+00 | 0.00000E+00 |
| *16 | −2.21947E−02 | 3.59089E+00 | −2.17933E−05 | −3.83366E−08 | 1.44393E−09 | −3.82844E−12 | 0.00000E+00 |
| *17 | −3.21759E−02 | 1.61081E−01 | −1.36366E−07 | −5.01226E−09 | 1.22720E−09 | −2.50224E−12 | 0.00000E+00 |

Interval Data

|      | d6 | d8 | d11 | d17 |
|------|-----|-----|-----|-----|
| Wide | 0.67775 | 9.86060 | 2.20414 | 0.60000 |
| Tele | 0.82577 | 0.6000 | 3.95334 | 7.96338 |

Figure 11:
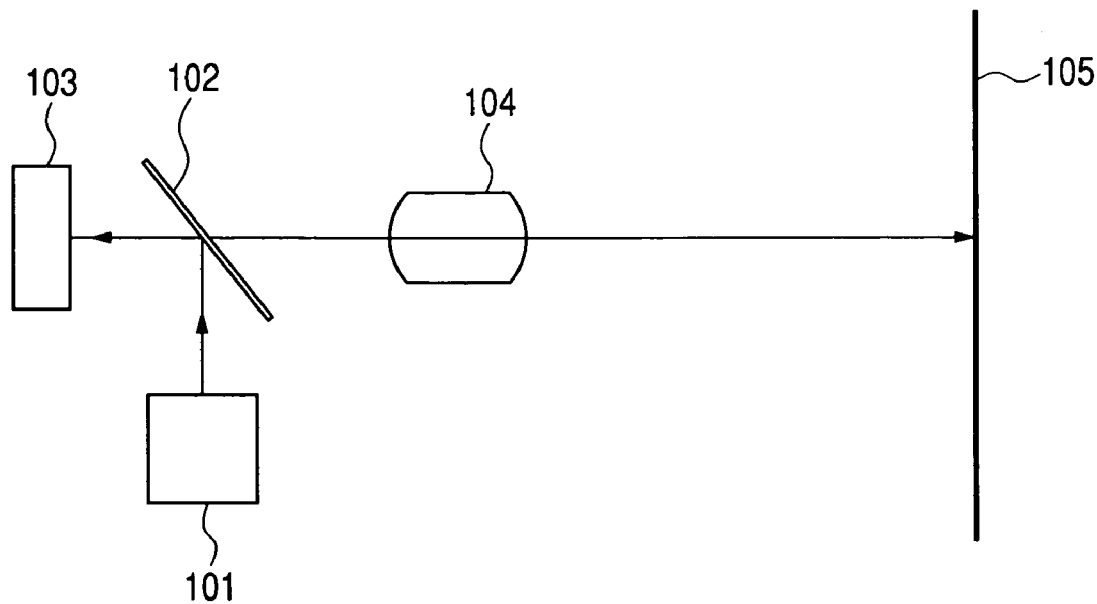
FIG. 11 is a main part schematic diagram showing an image projection apparatus which is applied as a reflection liquid crystal projector.

FIG. 11 is a main part schematic diagram showing a reflection liquid crystal projector (image projection apparatus) to which the zoom lens according to the embodiment mode of the present invention is applied.

A light flux emitted from an illumination means 101 is reflected on a beam splitter 102. The reflected light flux is incident on a reflection liquid crystal display panel 103 and reflected thereon. After that, a light flux modulated by the liquid crystal display panel 103 passes through the beam splitter 102 and is incident on a zoom lens 104. Image information based on the liquid crystal display panel 103 is projected onto a screen 105 by the zoom lens 104.

In this embodiment mode, a transmission liquid crystal display panel may be used instead of the liquid crystal display panel 103.

Figure 12:
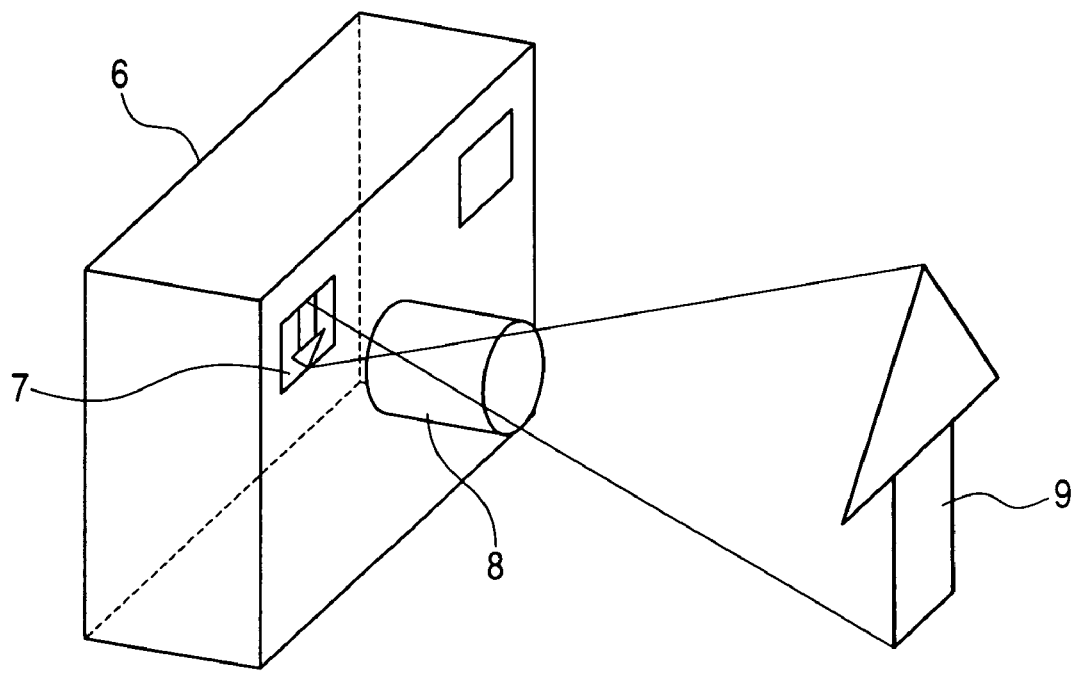
FIG. 12 a main part schematic view showing an image pickup device according to an embodiment mode of the present invention.

FIG. 12 a main part schematic view showing an image pickup device to which the zoom lens according to the embodiment mode of the present invention is applied. In this embodiment mode, the above-described zoom lens is used as an image pickup lens for an image pickup device such as a video camera, a film camera, or a digital camera. In FIG. 12, an image of a subject 9 is formed on a photosensitive member 7 by a zoom lens 8 to obtain image information.

According to such embodiments (particularly Embodiments 1 to 5), it is possible to realize a zoom lens in which a variation in optical performance, such as focal shift due to a change in environment such as an increase in temperature, is suppressed. In addition, it is possible to realize a retrofocus type zoom lens in which a large aperture, a wide view angle, and high power changing are obtained regardless of a reduction in the number of lenses by using an aspherical lens.

(Embodiment 6)

Figure 13:
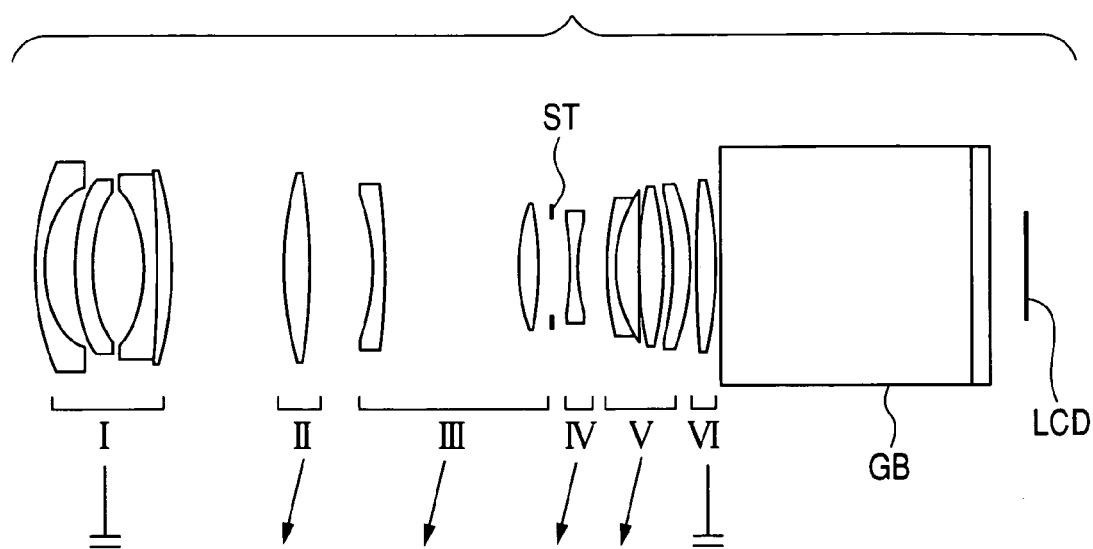
FIG. 13 is a sectional view showing a retrofocus zoom lens according to Embodiment 6 of the present invention.

Table 7 shows Numerical Embodiment 6 of the present invention and FIG. 13 is a sectional view showing a zoom lens thereof.

In this embodiment, the zoom lens includes six units, that is, a first lens unit having negative refracting power, a second lens unit having positive refracting power, a third lens unit having positive refracting power, a fourth lens unit having negative refracting power, a fifth lens unit having positive refracting power, and a sixth lens unit having positive refracting power, which are disposed in order from the object side. In power changing from the wide angle end to the telephoto end, the first and sixth lens units are held, so the entire length is constant. The second to fifth lens units are separately moved to the magnifying conjugate side. Note that the third or fourth lens unit may be held during power changing if possible.

The first lens unit includes four lenses, that is, a negative meniscus lens which is convex to the magnifying conjugate side, a negative meniscus lens which is convex to the magnifying conjugate side, a negative meniscus lens which is convex to the reducing conjugate side, and a positive meniscus lens which is convex to the reducing conjugate side, which are disposed in order from the magnifying conjugate side. The negative meniscus lens convex to the reducing conjugate side and the positive meniscus lens convex to the reducing conjugate side compose a bonded lens. A plastic lens is used as the second negative meniscus lens of the four lenses which is counted from the magnifying conjugate side. Each of the surfaces of the plastic lens is aspherical. When each of the surfaces of the plastic lens is formed to be aspherical, the distortion is mainly corrected. A surface which is convex to the reducing conjugate side is provided in the lens located closest to the reducing conjugate side, so the distortion and the astigmatism are corrected. Low dispersion glass (as specified in the conditional expression (3)) is used for each of the lenses of the first lens unit and a bonded lens is also used, with the result that the occurrence of magnification chromatic aberration is minimized. In this embodiment, the first lens unit is moved for focal adjustment.

The second lens unit includes a biconvex lens and mainly serves to correct various aberrations caused in the first lens unit. It is desirable to use a glass material having a high refraction index for the biconvex lens because it can be designed to reduce the in Petzval sum and suppress a variation in aberration such as spherical aberration at the time of power changing. When a field curvature and astigmatism at an intermediate image height or the like are large, resolving power deteriorates. Therefore, it is important to reduce the Petzval sum for correction. In view of the correction of chromatic aberration, glass having a high refraction index (refraction index is larger than 1.7, more preferably larger than 1.8) and low dispersion property (dispersion value is larger than 30, more preferably larger than 40) is used to efficiently correct the magnification chromatic aberration caused in the first lens unit L1.

The third lens unit in this embodiment includes two lenses, that is, a negative meniscus lens which is convex to the magnifying conjugate side and a biconvex lens. The third lens unit has a main power changing function. When the third lens unit is composed of the two lenses having the negative and positive refracting powers, although the third lens unit has a large aperture, a variation in magnification chromatic aberration is suppressed in a power changing range. Note that a stop is disposed in the third lens unit. In power changing, the diagram is moved together with the third lens unit. Therefore, a variation in off-axis aberration in power changing is suppressed.

The fourth lens unit includes a biconcave lens which is provided with negative strong refracting power and serves to correct a displacement of a focal plane due to power changing. When the biconcave lens having the negative strong refracting power is disposed, it is possible to efficiently design a small Petzval sum.

The fifth lens unit includes four lenses, that is, a negative meniscus lens which is convex to the magnifying conjugate side, a positive meniscus lens which is convex to the magnifying conjugate side, a biconvex lens, and a positive meniscus lens which is convex to the reducing conjugate side, which are disposed in order from the magnifying conjugate side. The negative meniscus lens convex to the magnifying conjugate side is bonded to the positive meniscus lens convex to the magnifying conjugate side. The lens having negative strong refracting power is disposed closest to the screen side to efficiently reduce the Petzval sum. The lens is also effective for controlling a position of a rear side principal point to ensure preferable telecentric property, thereby obtaining a back focus which is a necessary length. Low dispersion glass is used for the biconvex lens to reduce chromatic aberration. Plastic is used as a material of the positive meniscus lens located closest to the reducing conjugate side and each of the surfaces of the lens is formed to be aspherical. Therefore, off-axis aberration such as astigmatism can be efficiently corrected.

The sixth lens unit includes a biconvex lens. A biconvex lens having strong power is used to provide the telecentric property.

In this embodiment, the aspherical plastic lens having the positive power and the aspherical plastic lens having the negative power are used. However, the present invention is not limited to this. Even when a plurality of plastic lenses are used, power may be adequately set to correct focal shift. A material of an aspherical lens is not limited to plastic and may be glass. A so-called hybrid type lens in which a thin resin layer is formed on an optical surface to obtain an aspherical shape may be used.

According to this embodiment, it is possible to realize a high-power variable projection lens which has a small F number of 1.8, which can project a 100-inch image at a short distance of about 3.0 m, and which has a zoom magnification of about 1.7.

Figure 17A:
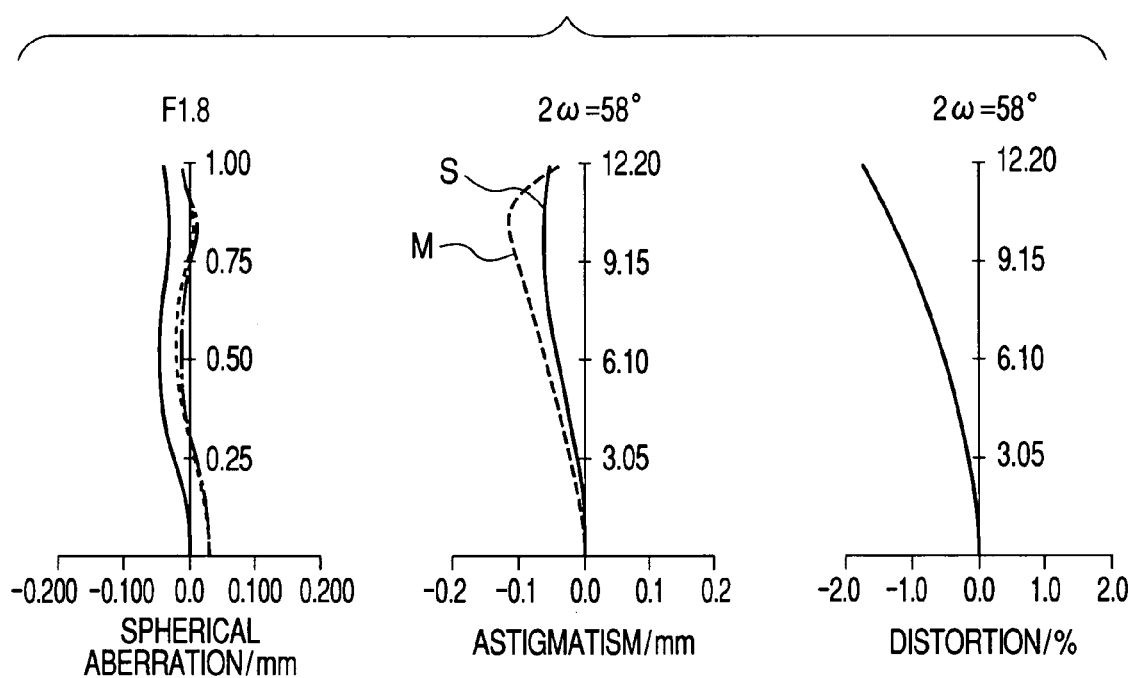
Figure 17B:
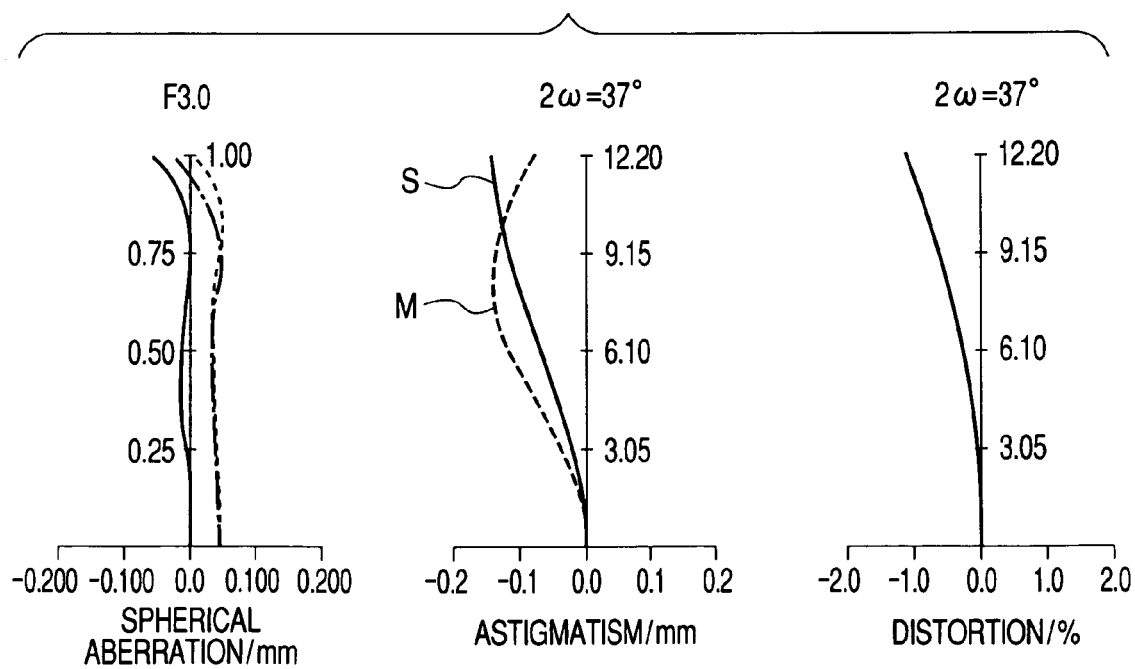

FIGS. 17A and 17B are aberration graphs at the wide angle end and the telephoto end in a state that the retrofocus zoom lens according to this embodiment is focused at 2.1 m by using the first lens unit.

Numerical values used in the conditional expressions (1), (3), and (4) in this embodiment are as follows.

Conditional Expression $fn/fp=-0.38$ (1)

$v1n=55.6$ (3)

$fw/bf=0.525$ (4)

(Embodiment 7)

Figure 14:
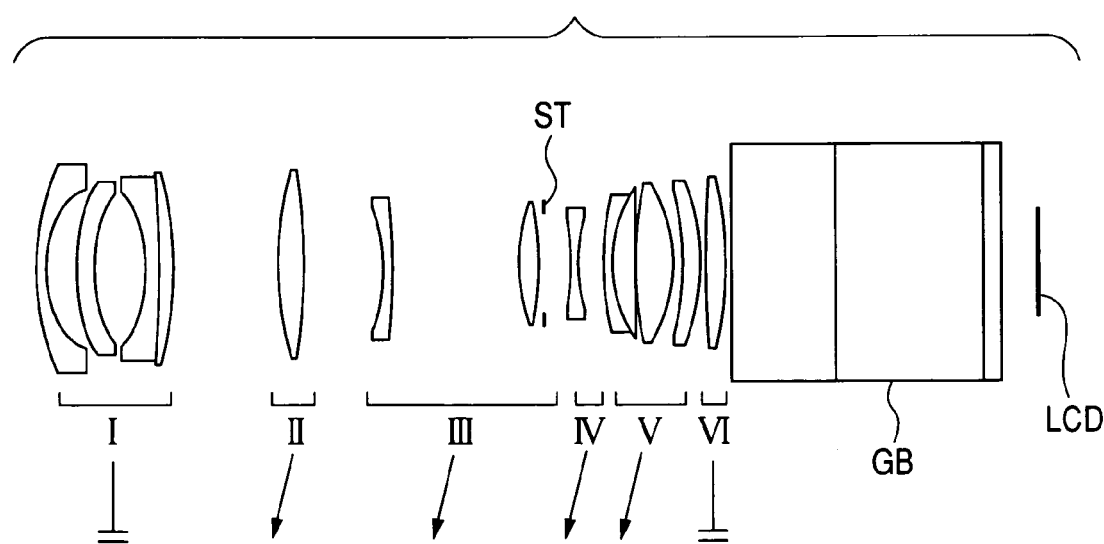
FIG. 14 is a sectional view showing a retrofocus zoom lens according to Embodiment 7 of the present invention.

Table 8 shows Numerical Embodiment 7 of the present invention and FIG. 14 is a sectional view showing a zoom lens thereof. Sections which are not particularly described here are identical to those in Embodiment 6.

In this embodiment, the zoom lens includes six units, that is, a first lens unit having negative refracting power, a second lens unit having positive refracting power, a third lens unit having positive refracting power, a fourth lens unit having negative refracting power, a fifth lens unit having positive refracting power, and a sixth lens unit having positive refracting power, which are disposed in order from the object side. In power changing from the wide angle end to the telephoto end, the first and sixth lens units are held, so the entire length is constant. The second to fifth lens units are separately moved to the magnifying conjugate side.

The first lens unit includes four lenses, that is, a negative meniscus lens which is convex to the magnifying conjugate side, a negative meniscus lens which is convex to the magnifying conjugate side, a negative meniscus lens which is convex to the reducing conjugate side, and a positive meniscus lens which is convex to the reducing conjugate side, which are disposed in order from the magnifying conjugate side. The negative meniscus lens convex to the reducing conjugate side and the positive meniscus lens convex to the reducing conjugate side compose a bonded lens. A plastic lens is used as the second negative meniscus lens of the four lenses which is counted from the magnifying conjugate side. Each of the surfaces of the plastic lens is aspherical. When each of the surfaces of the plastic lens is formed to be aspherical, the distortion is mainly corrected. A surface which is convex to the reducing conjugate side is provided in the lens located closest to the reducing conjugate side, so the distortion and the astigmatism are corrected. Low dispersion glass is used for each of the lenses of the first lens unit and the bonded lens is also used, with the result that the occurrence of magnification chromatic aberration is minimized. In this embodiment, the first lens unit performs focusing.

The second lens unit includes a biconvex lens and mainly serves to correct various aberrations caused in the first lens unit. It is desirable to use a glass material having a high refraction index for the biconvex lens because it can be designed to correct the Petzval sum and suppress a variation in aberration such as spherical aberration at the time of power changing. When a field curvature and astigmatism at an intermediate image height or the like are large, resolving power deteriorates. Therefore, it is important to reduce the Petzval sum by correction. In view of the correction of chromatic aberration, glass having a high refraction index and low dispersion property is used to efficiently correct the magnification chromatic aberration caused in the first lens unit.

The third lens unit in this embodiment includes two lenses, that is, a negative meniscus lens which is convex to the magnifying conjugate side and a biconvex lens. The third lens unit has a main power changing function. When the third lens unit is composed of the two lenses having the negative and positive refracting powers, although the third lens unit has a large aperture, a variation in magnification chromatic aberration is suppressed in a power changing range. Note that a stop is disposed in the third lens unit. In power changing, the diagram is moved together with the third lens unit. Therefore, a variation in off-axis aberration in power changing is suppressed.

The fourth lens unit includes a biconcave lens which is provided with negative strong refracting power and serves to correct a displacement of a focal plane due to power changing. When the biconcave lens having the negative strong refracting power is disposed, it is possible to efficiently design a small Petzval sum.

The fifth lens unit includes four lenses, that is, a negative meniscus lens which is convex to the magnifying conjugate side, a positive meniscus lens which is convex to the magnifying conjugate side, a biconvex lens, and a positive meniscus lens which is convex to the reducing conjugate side, which are disposed in order from the magnifying conjugate side. The negative meniscus lens convex to the magnifying conjugate side is bonded to the positive meniscus lens convex to the magnifying conjugate side. The lens having negative strong refracting power is disposed closest to the screen side to efficiently reduce the Petzval sum. The lens is also effective for controlling a position of a rear side principal point to ensure preferable telecentric property, thereby obtaining a back focus which is a necessary length. Low dispersion glass is used for the biconvex lens to reduce chromatic aberration. Plastic is used as a material of the positive meniscus lens located closest to the reducing conjugate side and each of the surfaces of the lens is formed to be aspherical. Therefore, off-axis aberration such as astigmatism can be efficiently corrected.

The sixth lens unit includes a positive meniscus lens which is convex to the reducing conjugate side. A biconvex lens having strong power is used to provide the telecentric property.

In this embodiment, the aspherical plastic lens having the positive power and the aspherical plastic lens having the negative power are used. However, the present invention is not limited to this. Even when a plurality of plastic lenses are used, power may be adequately set to correct focal shift. A material of an aspherical lens is not limited to plastic and may be glass. A so-called hybrid type lens in which a thin resin layer is formed on an optical surface to obtain an aspherical shape may be used.

According to this embodiment, it is possible to realize a high-power variable projection lens which has a small F number of 1.8, which can project a 100-inch image at a short distance of about 3.0 m, and which has a zoom magnification of about 1.7.

FIGS. 18A and 18B are aberration graphs at the wide angle end and the telephoto end in a state that the retrofocus zoom lens according to this embodiment is focused at 1.7 m by using the first lens unit.

Numerical values used in the conditional expressions (1), (3), and (4) in this embodiment are as follows.

Conditional Expression $$fn/fp = -0.436 \quad (1)$$

$$v1n = 52.6 \quad (3)$$

$$fw/bf = 0.524 \quad (4)$$

(Embodiment 8)

Figure 15:
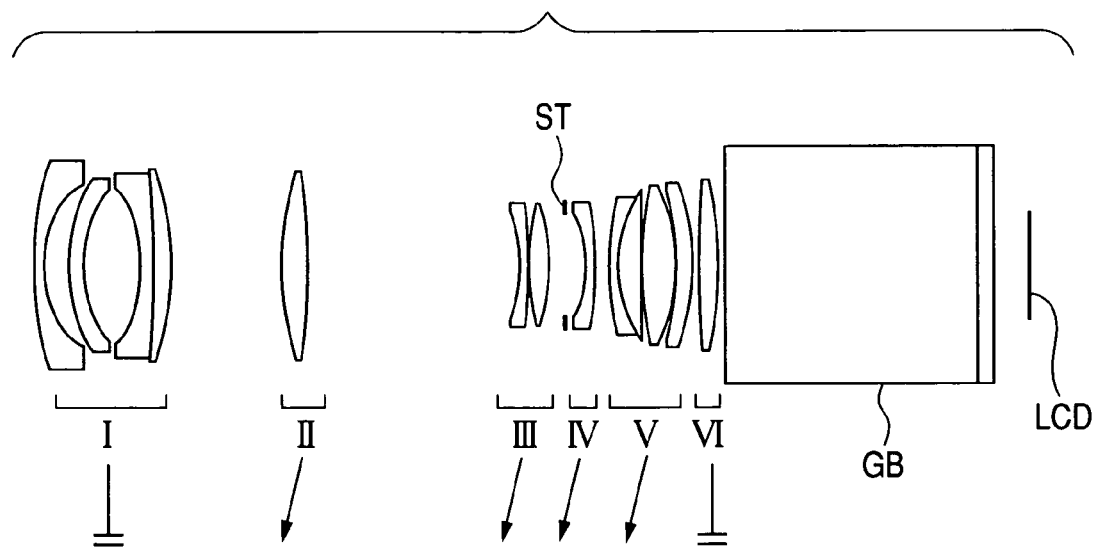
FIG. 15 is a sectional view showing a retrofocus zoom lens according to Embodiment 8 of the present invention.

Table 9 shows Numerical Embodiment 8 of the present invention and FIG. 15 is a sectional view showing a zoom lens thereof. Sections which are not particularly described here are identical to those in Embodiment 6.

In this embodiment, the zoom lens includes six units, that is, a first lens unit having negative refracting power, a second lens unit having positive refracting power, a third lens unit having positive refracting power, a fourth lens unit having negative refracting power, a fifth lens unit having positive refracting power, and a sixth lens unit having positive refracting power, which are disposed in order from the object side. In power changing from the wide angle end to the telephoto end, the first and sixth lens units are held, so the entire length is constant. The second to fifth lens units are separately moved to the magnifying conjugate side.

The first lens unit includes four lenses, that is, a negative meniscus lens which is convex to the magnifying conjugate side, a negative meniscus lens which is convex to the magnifying conjugate side, a negative meniscus lens which is convex to the reducing conjugate side, and a positive meniscus lens which is convex to the reducing conjugate side, which are disposed in order from the magnifying conjugate side. The negative meniscus lens convex to the reducing conjugate side and the positive meniscus lens convex to the reducing conjugate side compose a bonded lens. A plastic lens is used as the second negative meniscus lens of the four lenses which is counted from the magnifying conjugate side. Each of the surfaces of the plastic lens is aspherical. When each of the surfaces of the plastic lens is formed to be aspherical, the distortion is mainly corrected. A surface which is convex to the reducing conjugate side is provided in the lens located closest to the reducing conjugate side, so the distortion and the astigmatism are corrected. Low dispersion glass is used for each of the lenses of the first lens unit and the bonded lens is also used, with the result that the occurrence of magnification chromatic aberration is minimized. In this embodiment, the first lens unit performs focusing.

The second lens unit includes a biconvex lens and mainly serves to correct various aberrations caused in the first lens unit. It is desirable to use a glass material having a high refraction index for the biconvex lens because it can be designed to correct the Petzval sum and suppress a variation in aberration such as spherical aberration at the time of power changing. When a field curvature and astigmatism at an intermediate image height or the like are large, resolving power deteriorates. Therefore, it is important to reduce the Petzval sum by correction. In view of the correction of chromatic aberration, glass having a high refraction index and low dispersion property is used to efficiently correct the magnification chromatic aberration caused in the first lens unit.

The third lens unit in this embodiment includes two lenses, that is, a negative meniscus lens which is convex to the magnifying conjugate side and a biconvex lens. The third lens unit has a main power changing function. When the third lens unit is composed of the two lenses having the negative and positive refracting powers, although the third lens unit has a large aperture, a variation in magnification chromatic aberration is suppressed in a power changing range. Note that a stop is disposed in the third lens unit. In power changing, the diagram is moved together with the third lens unit. Therefore, a variation in off-axis aberration in power changing is suppressed.

The fourth lens unit includes a negative meniscus lens which is convex to the reducing conjugate side and provided with negative strong refracting power, and serves to correct a displacement of a focal plane due to power changing. When the lens having the negative strong refracting power is disposed, it is possible to efficiently design a small Petzval sum.

The fifth lens unit includes four lenses, that is, a negative meniscus lens which is convex to the magnifying conjugate side, a first biconvex lens, a second biconvex lens, and a positive meniscus lens which is convex to the reducing conjugate side, which are disposed in order from the magnifying conjugate side. The negative meniscus lens convex to the magnifying conjugate side is bonded to the first biconvex lens. The lens having negative strong refracting power is disposed closest to the screen side to efficiently reduce the Petzval sum. The lens is also effective for controlling a position of a rear side principal point to ensure preferable telecentric property, thereby obtaining a back focus which is a necessary length. Low dispersion glass is used for the first and second biconvex lenses to reduce chromatic aberration. Plastic is used as a material of the positive meniscus lens located closest to the reducing conjugate side and each of the surfaces of the lens is formed to be aspherical. Therefore, off-axis aberration such as astigmatism can be efficiently corrected.

The sixth lens unit includes a biconvex lens. The biconvex lens having strong power is used to provide the telecentric property.

In this embodiment, the aspherical plastic lens having the positive power and the aspherical plastic lens having the negative power are used. However, the present invention is not limited to this. Even when a plurality of plastic lenses are used, power may be adequately set to correct focal shift. A material of an aspherical lens is not limited to plastic and may be glass. A so-called hybrid type lens in which a thin resin layer is formed on an optical surface to obtain an aspherical shape may be used.

According to this embodiment, it is possible to realize a high-power variable projection lens which has a small F number of 1.8, which can project a 100-inch image at a short distance of about 2.5 m, and which has a zoom magnification of about 1.7.

Figure 19A:
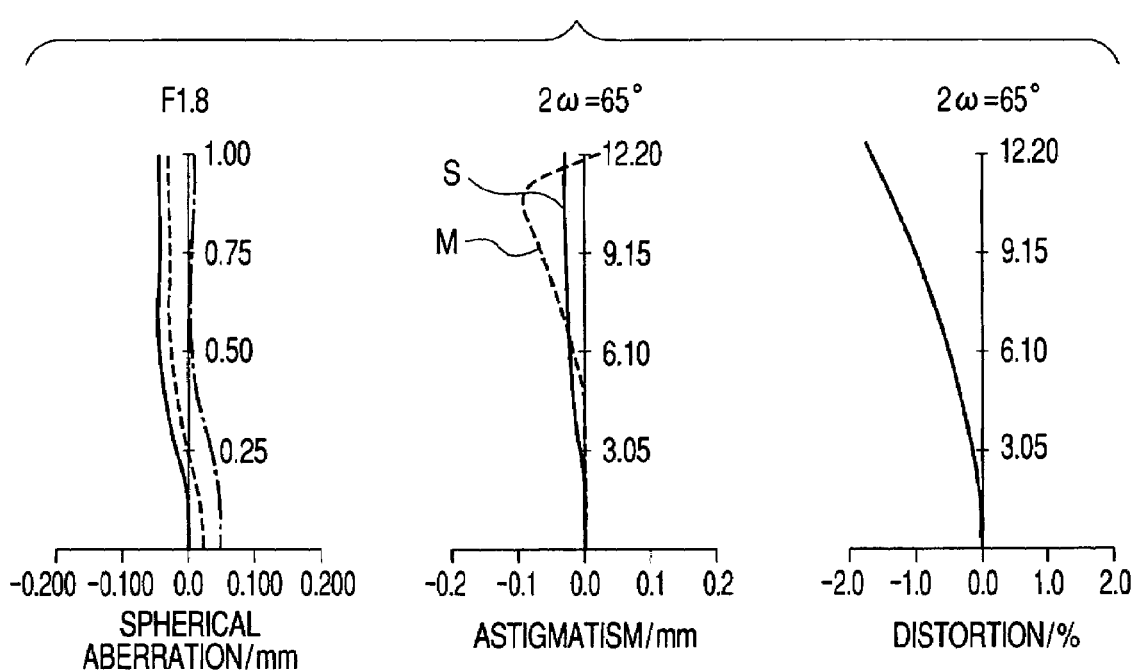
Figure 19B:
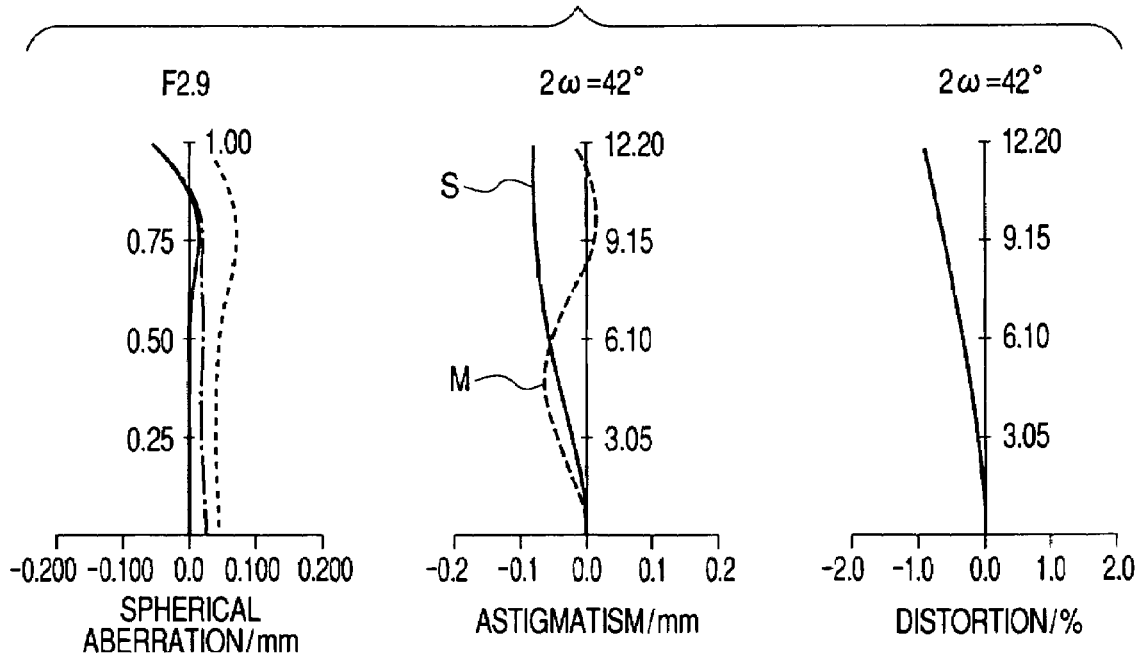

FIGS. 19A and 19B are aberration graphs at the wide angle end and the telephoto end in a state that the retrofocus zoom lens according to this embodiment is focused at 2.1 m by using the first lens unit.

Numerical values used in the conditional expressions (1), (3), and (4) in this embodiment are as follows.

Conditional Expression $fn/fp=-0.357$ (1)

$v1n=55.6$ (3)

$fw/bf=0.456$ (4)

(Embodiment 9)

Figure 16:
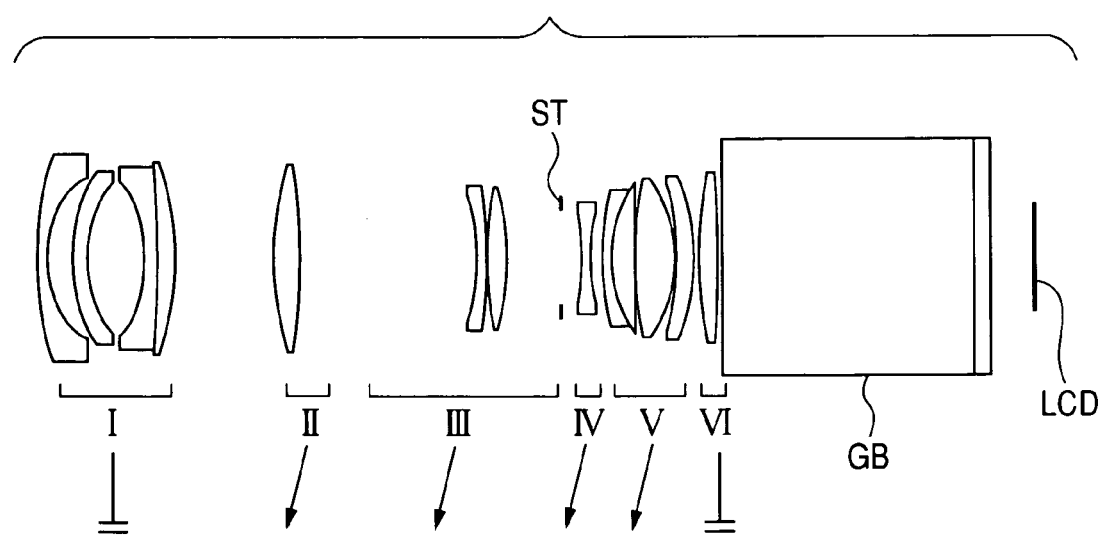
FIG. 16 is a sectional view showing a retrofocus zoom lens according to Embodiment 9 of the present invention.

Table 10 shows Numerical Embodiment 9 of the present invention and FIG. 16 is a sectional view showing a zoom lens thereof. Sections which are not particularly described here are identical to those in Embodiment 6.

In this embodiment, the zoom lens includes six units, that is, a first lens unit having negative refracting power, a second lens unit having positive refracting power, a third lens unit having positive refracting power, a fourth lens unit having negative refracting power, a fifth lens unit having positive refracting power, and a sixth lens unit having positive refracting power, which are disposed in order from the object side. In power changing from the wide angle end to the telephoto end, the first and sixth lens units are held, so the entire length is constant. The second to fifth lens units are separately moved to the magnifying conjugate side.

The first lens unit includes four lenses, that is, a negative meniscus lens which is convex to the magnifying conjugate side, a negative meniscus lens which is convex to the magnifying conjugate side, a biconcave lens, and a biconvex lens, which are disposed in order from the magnifying conjugate side. The biconcave lens and the biconvex lens are bonded to each other to compose a bonded lens. A plastic lens is used as the second negative meniscus lens of the four lenses which is counted from the magnifying conjugate side. Each of the surfaces of the plastic lens is aspherical. When each of the surfaces of the plastic lens is formed to be aspherical, the distortion is mainly corrected. Low dispersion glass is used for each of the lenses of the first lens unit and the bonded lens is also used, with the result that the occurrence of magnification chromatic aberration is minimized. In this embodiment, the first lens unit performs focusing.

The second lens unit includes a biconvex lens and mainly serves to correct various aberrations caused in the first lens unit. It is desirable to use a glass material having a high refraction index for the biconvex lens because it can be designed to correct the Petzval sum and suppress a variation in aberration such as spherical aberration at the time of power changing. When a field curvature and astigmatism at an intermediate image height or the like are large, resolving power deteriorates. Therefore, it is important to reduce the Petzval sum by correction. In view of the correction of chromatic aberration, glass having a high refraction index and low dispersion property is used to efficiently correct the magnification chromatic aberration caused in the first lens unit.

The third lens unit in this embodiment includes two lenses, that is, a negative meniscus lens which is convex to the magnifying conjugate side and a biconvex lens. The third lens unit has a main power changing function. When the third lens unit is composed of the two lenses having the negative and positive refracting powers, although the third lens unit has a large aperture, a variation in magnification chromatic aberration is suppressed in a power changing range. Note that a stop is disposed in the third lens unit. In power changing, the diagram is moved together with the third lens unit. Therefore, a variation in off-axis aberration in power changing is suppressed.

The fourth lens unit includes a negative meniscus lens which is convex to the reducing conjugate side and provided with negative strong refracting power, and serves to correct a displacement of a focal plane due to power changing. When the lens having the negative strong refracting power is disposed, it is possible to efficiently design a small Petzval sum.

The fifth lens unit includes four lenses, that is, a biconcave lens, a first biconvex lens, a second biconvex lens, and a positive meniscus lens which is convex to the reducing conjugate side, which are disposed in order from the magnifying conjugate side. The biconcave lens is bonded to the first biconvex lens. The lens having negative strong refracting power is disposed closest to the screen side to efficiently reduce the Petzval sum. The lens is also effective for controlling a position of a rear side principal point to ensure preferable telecentric property, thereby obtaining a back focus which is a necessary length. Low dispersion glass is used for the first and second biconvex lenses to reduce chromatic aberration. Plastic is used as a material of the positive meniscus lens located closest to the reducing conjugate side and each of the surfaces of the lens is formed to be aspherical. Therefore, off-axis aberration such as astigmatism can be efficiently corrected.

The sixth lens unit includes a biconvex lens. The biconvex lens having strong power is used to provide the telecentric property.

In this embodiment, the aspherical plastic lens having the positive power and the aspherical plastic lens having the negative power are used. However, the present invention is not limited to this. Even when a plurality of plastic lenses are used, power may be adequately set to correct focal shift. A material of an aspherical lens is not limited to plastic and may be glass. A so-called hybrid type lens in which a thin resin layer is formed on an optical surface to obtain an aspherical shape may be used.

According to this embodiment, it is possible to realize a high-power variable projection lens which has a small F number of 1.8, which can project a 100-inch image at a short distance of about 3.0 m, and which has a zoom magnification of about 2.0.

Figure 20A:
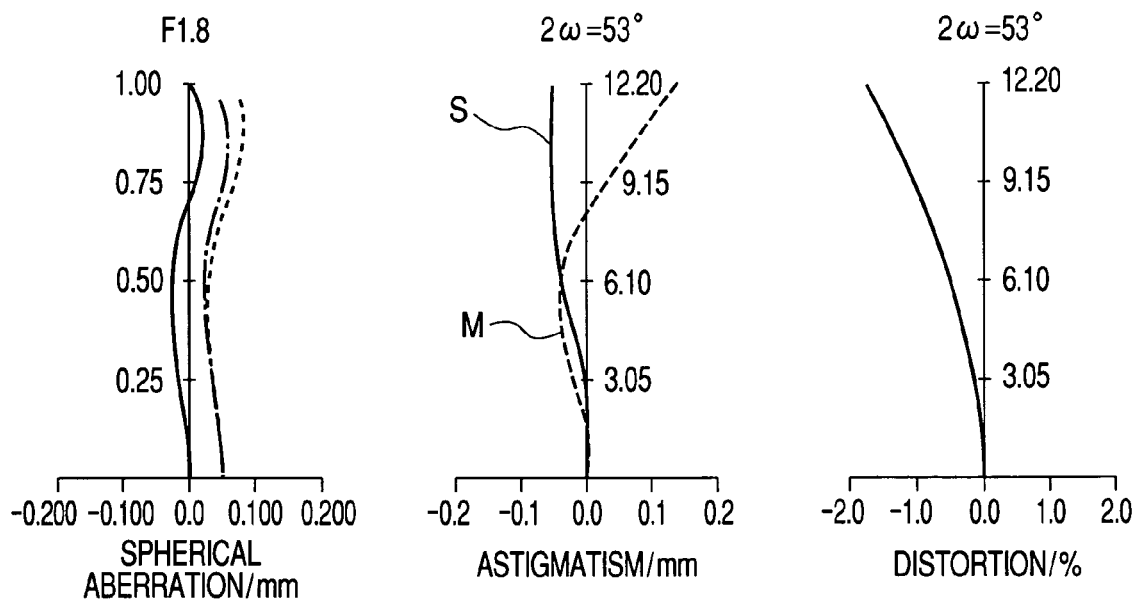
Figure 20B:
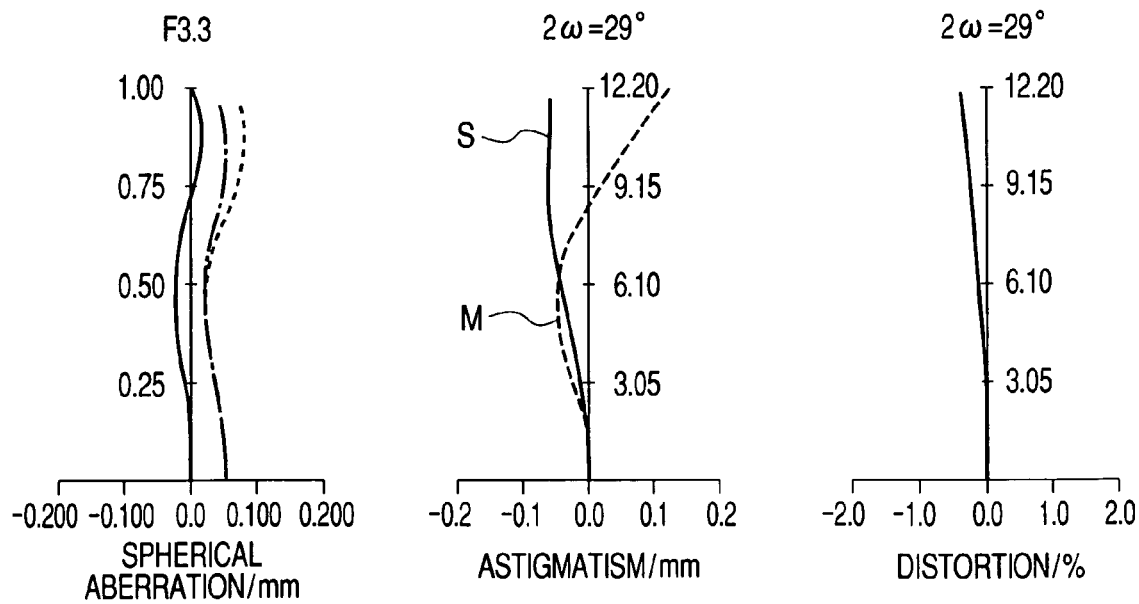

FIGS. 20A and 20B are aberration graphs at the wide angle end and the telephoto end in a state that the retrofocus zoom lens according to this embodiment is focused at 2.1 m by using the first lens unit.

Numerical values used in the conditional expressions (1), (3), and (4) in this embodiment are as follows.

Conditional Expression $fn/fp=-0.388$ (1)

$v1n=58.4$ (3)

$fw/bf=0.588$ (4)

Here, the term "lens unit" is used in the above-mentioned embodiments. Even a single lens is referred to as the lens unit. Even two or more lenses are referred to as the lens unit. In the embodiments, the example using the two aspherical surfaces and the example using the three aspherical surfaces are described. Only a single aspherical surface may be used. A structure having four or more aspherical surfaces may be used.

The projection lens according to each of the embodiments has the six-unit structure. However, a lens having weak refracting power may be disposed between two arbitrary lens units. For example, a lens (a plurality of lenses may be used) which has positive weak refracting power and is held or moved by a moving distance shorter than that of the second lens unit during power changing may be located between the first lens unit and the second lens unit. The lens may be a negative power lens. In addition, the lens may be disposed between the second lens unit and the third lens unit, between the third lens unit and the fourth lens unit, between the fourth lens unit and the fifth lens unit, between the fifth lens unit and the sixth lens unit, closer to the magnifying conjugate side than the first lens unit, or closer to the reducing conjugate side than the sixth lens unit. The lens having the positive weak refracting power as described here may be a parallel plate having no refracting power.

The present invention in this application includes not only the projection lens (retrofocus zoom lens) described in each of the embodiments but also an image display apparatus having the projection lens. For example, there is an image display apparatus which has three image display devices (for red, green, and blue), an illumination optical system for illuminating the three image display devices with light from a light source, and the projection lens for projecting light beams from the three image display devices to a surface to be projected, such as a screen, as described in each of the embodiments. Each of the image display devices is preferably a reflection image display device. If possible, it is desirable to use a structure in which light reflected on the image display devices passes through a polarized beam splitter (PBS) or a polarized beam separating film twice (may transmit therethrough or may be reflected thereon) and then is incident on a lens unit having refracting power. In other words, the polarized beam splitter (PBS) or the polarized beam separating film as described here corresponds to the portion shown as the GB (glass block) in FIGS. 13 to 16. It is desirable to dispose a ¼λ plate between the image display elements and the polarized beam splitter or between the image display elements and the polarized beam separating film. The number of image display devices is not limited to three and may be four.

The projection lens described in each of the embodiments can be also used as an image pickup lens for an image pickup device. In this case, the magnifying conjugate side is the object (subject) side and the reducing conjugate side is the film (CCD) surface side.

It is expected that the scope of the present invention involve an optical device having the projection lens (zoom lens) described in any of the embodiments.

According to the zoom lens as described in each of the embodiments, in particular, the zoom lens suitable for use in an image display apparatus (image projection apparatus), it is possible to realize a retrofocus zoom lens in which a back focus is long but various aberrations are preferably corrected and telecentric property, a large aperture, a wide view angle, and high power changing are obtained. When the aspherical plastic lenses having positive and negative powers are adequately set, it is possible to realize a retrofocus zoom lens in which focal shift due to a change in environment, such as an increase in temperature, is suppressed and the number of constituent lenses is small.

TABLE 7

Numerical Embodiment 6

| | Ri | di | Nj | vj |
|---|---|---|---|---|
| 1 | 76.67493 | 2.20000 | 1.696797 | 55.5 |
| 2 | 23.46284 | 6.75845 | | |
| 3 | 40.17309 | 3.20000 | 1.529960 | 55.8 |
| 4 | 22.85924 | 12.16879 | | |
| 5 | 0.00000 | 0.00000 | | |
| 6 | −29.73645 | 2.35000 | 1.487490 | 70.2 |
| 7 | −172.02896 | 4.80000 | 1.806098 | 40.9 |
| 8 | −43.93527 ( . . . ) | | | |
| 9 | 64.71344 | 5.60000 | 1.806098 | 40.9 |
| 10 | −174.88901 ( . . . ) | | | |
| 11 | −56.18077 | 2.00000 | 1.548141 | 45.8 |
| 12 | −113.17145 | 30.08555 | | |
| 13 | 46.00199 | 4.15000 | 1.487490 | 70.2 |
| 14 | −117.48793 | 3.47703 | | |
| stop15 | 0.00000 | 0.15000 | | |
| 16 | 0.00000 ( . . . ) | | | |
| 17 | −55.96299 | 1.55000 | 1.805181 | 25.4 |
| 18 | 46.47254 | | | |
| 19 | 61.13232 | 1.75000 | 1.806098 | 40.9 |
| 20 | 26.74828 | 5.50000 | 1.487490 | 70.2 |
| 21 | 418.34430 | 0.15000 | | |
| 22 | 66.52835 | 7.20000 | 1.487490 | 70.2 |
| 23 | −43.80730 | 0.52665 | | |
| 24 | −301.83375 | 4.20000 | 1.529960 | 55.8 |
| 25 | −100.21808 | | | |
| 26 | 339.12751 | 4.00000 | 1.805181 | 25.4 |
| 27 | −82.11765 | 1.45000 | | |
| 28 | 0.00000 | 55.00000 | 1.841390 | 24.6 |
| 29 | 0.00000 | 0.00000 | | |
| 30 | 0.00000 | 3.80000 | 1.516330 | 64.1 |
| 31 | 0.00000 | 8.62019 | | |

Aspherical Data

| | 1/r | K | A | B | C | D | E |
|---|---|---|---|---|---|---|---|
| 3 | 2.48923E−02 | 2.40423E+00 | −1.94267E−05 | 4.84268E−08 | −1.35308E−10 | 1.77266E−13 | −2.33207E−16 |
| 4 | 4.37460E−02 | −3.40958E+00 | 3.15471E−06 | 1.30894E−09 | −1.56614E−11 | −1.14256E−13 | 1.49735E−16 |
| 24 | −3.31308E−03 | −5.02598E+02 | −1.79963E−05 | −3.05610E−08 | 1.00606E−10 | −2.78002E−13 | 1.14257E−16 |
| 25 | −9.97824E−03 | −2.48214E+01 | −1.80743E−05 | −2.07015E−08 | 3.34530E−11 | −4.94376E−14 | −1.32347E−16 |

Interval Data

| | d8 | d10 | d16 | d18 | d25 |
|---|---|---|---|---|---|
| Wide | 23.24904 | 14.45310 | 4.06322 | 6.44844 | 0.90342 |
| Tele | 1.60000 | 3.92126 | 20.00815 | 1.46740 | 22.12051 |

TABLE 8

Numerical Embodiment 7

| | Ri | di | Nj | vj |
|---|---|---|---|---|
| 1 | 189.74668 | 2.20000 | 1.622296 | 53.2 |
| 2 | 23.96463 | 5.14217 | | |
| 3 | 48.10071 | 3.20000 | 1.527090 | 56.0 |
| 4 | 29.47801 | 12.16879 | | |
| 5 | 0.00000 | 0.00000 | | |
| 6 | −31.43213 | 2.50000 | 1.516330 | 64.1 |
| 7 | −114.74620 | 4.80000 | 1.834000 | 37.2 |
| 8 | −45.49939 ( . . . ) | | | |
| 9 | 57.96961 | 5.70000 | 1.806098 | 40.9 |
| 10 | −245.43665 ( . . . ) | | | |
| 11 | −53.81263 | 2.00000 | 1.548141 | 45.8 |
| 12 | −117.98515 | 27.70733 | | |
| 13 | 52.59428 | 3.85000 | 1.516330 | 64.1 |
| 14 | −118.80963 | 0.90601 | | |
| stop15 | 0.00000 | 5.03998 | | |
| 16 | 0.00000 ( . . . ) | | | |
| 17 | −47.13908 | 1.80000 | 1.805181 | 25.4 |
| 18 | 57.33312 ( . . . ) | | | |

TABLE 8-continued

Numerical Embodiment 7

| | | | | |
|---|---|---|---|---|
| 19 | 48.96237 | 1.90000 | 1.834000 | 37.2 |
| 20 | 25.43053 | 5.00000 | 1.516330 | 64.1 |
| 21 | 76.91416 | 0.17112 | | |
| 22 | 46.81252 | 8.60000 | 1.496999 | 81.5 |
| 23 | −39.16236 | 2.25102 | | |
| 24 | −300.00000 | 4.30000 | 1.527090 | 56.0 |
| 25 | −115.24194 ( . . . ) | | | |
| 26 | −2970.51310 | 4.00000 | 1.846663 | 23.8 |
| 27 | −69.36802 | 1.45000 | | |
| 28 | 0.00000 | 24.00000 | 1.841390 | 24.6 |
| 29 | 0.00000 | 31.00000 | 1.834807 | 42.7 |
| 30 | 0.00000 | 3.80000 | 1.516330 | 64.1 |
| 31 | 0.00000 | 8.56020 | | |

Aspherical Data

| | 1/r | K | A | B | C | D | E |
|---|---|---|---|---|---|---|---|
| 3 | 2.07897E−02 | 3.75739E+00 | 9.88057E−06 | 2.36241E−09 | −9.20767E−11 | 2.32518E−13 | −2.98160E−16 |
| 4 | 3.39236E−02 | −4.91737E+00 | 2.75013E−05 | −4.16411E−08 | −2.35810E−12 | 4.85283E−14 | −9.29741E−17 |
| 24 | −3.33333E−03 | −1.24448E+03 | −2.51228E−05 | −6.54969E−09 | −2.60745E−12 | 5.77969E−14 | 1.41230E−16 |
| 25 | −8.67740E−03 | −8.75025E+01 | −2.26327E−05 | −6.18684E−09 | 3.50397E−11 | −5.87413E−14 | 1.64902E−16 |

Interval Data

| | d8 | d10 | d16 | d18 | d25 |
|---|---|---|---|---|---|
| Wide | 22.17021 | 17.29056 | 1.37674 | 5.12607 | 0.90000 |
| Tele | 1.60000 | 2.87834 | 21.34142 | 0.83941 | 20.20441 |

TABLE 9

Numerical Embodiment 8

| | Ri | di | Nj | νj |
|---|---|---|---|---|
| 1 | 146.34118 | 2.20000 | 1.696797 | 55.5 |
| 2 | 24.00010 | 5.17626 | | |
| 3 | 39.30960 | 3.20000 | 1.529960 | 55.8 |
| 4 | 22.50811 | 13.24954 | | |
| 5 | 0.00000 | 0.00000 | | |
| 6 | −31.27606 | 2.50000 | 1.487490 | 70.2 |
| 7 | −109.35463 | 4.55000 | 1.806098 | 40.9 |
| 8 | −44.36270 ( . . . ) | | | |
| 9 | 64.91012 | 5.33964 | 1.806098 | 40.9 |
| 10 | −301.84135 ( . . . ) | | | |
| 11 | −38.31713 | 1.80000 | 1.603420 | 38.0 |
| 12 | −70.50725 | 0.15000 | | |
| 13 | 77.23796 | 4.10861 | 1.516330 | 64.1 |
| 14 | −56.44846 | 4.39385 | | |
| stop15 | 0.00000 | 0.15000 | | |
| 16 | 0.00000 ( . . . ) | | | |
| 17 | −33.07139 | 1.45000 | 1.805181 | 25.4 |
| 18 | −89.01044 ( . . . ) | | | |
| 19 | −398.41068 | 1.50000 | 1.834000 | 37.2 |
| 20 | 28.39039 | 5.70000 | 1.487490 | 70.2 |
| 21 | −210.81505 | 0.15000 | | |
| 22 | 80.26506 | 7.96198 | 1.487490 | 70.2 |
| 23 | −31.80238 | 0.15000 | | |
| 24 | −155.31847 | 4.09238 | 1.529960 | 55.8 |
| 25 | −79.04057 ( . . . ) | | | |
| 26 | 1109.55200 | 3.94625 | 1.805181 | 25.4 |
| 27 | −78.87427 | 1.45000 | | |
| 28 | 0.00000 | 55.00000 | 1.841390 | 24.6 |
| 29 | 0.00000 | 0.00000 | | |
| 30 | 0.00000 | 3.80000 | 1.516330 | 64.1 |
| 31 | 0.00000 | 8.63434 | | |

Aspherical Data

| | 1/r | K | A | B | C | D | E |
|---|---|---|---|---|---|---|---|
| 3 | 2.54391E−02 | 2.07132E+00 | −3.80643E−06 | 4.73105E−08 | −2.58270E−10 | 5.77419E−13 | −5.45219E−16 |
| 4 | 4.44284E−02 | −4.15198E+00 | 2.90238E−05 | −3.80391E−08 | −9.47657E−11 | 3.88873E−13 | −4.28476E−16 |

TABLE 9-continued

Numerical Embodiment 8

| | | | | | | |
|---|---|---|---|---|---|---|
| 24 | −6.43838E−03 | 2.70930E+01 | −1.89733E−05 | −3.68349E−08 | 9.84241E−11 | −2.41198E−13 | −1.66920E−16 |
| 25 | −1.26517E−02 | −9.96321E+00 | −2.03497E−05 | −2.45526E−08 | 3.86428E−11 | −6.32590E−14 | −2.31265E−16 |

Interval Data

| | d8 | d10 | d16 | d18 | d25 |
|---|---|---|---|---|---|
| Wide | 23.28832 | 48.97629 | 1.87103 | 5.59585 | 0.90000 |
| Tele | 1.60000 | 27.50217 | 31.11905 | 0.53796 | 19.87232 |

TABLE 10

Numerical Embodiment 9

| | Ri | di | Nj | νj |
|---|---|---|---|---|
| 1 | 156.70144 | 2.20000 | 1.487490 | 70.2 |
| 2 | 26.42211 | 4.45240 | | |
| 3 | 26.05490 | 3.20000 | 1.529960 | 55.8 |
| 4 | 17.50000 | 12.24013 | | |
| 5 | 0.00000 | 0.00000 | | |
| 6 | −44.54575 | 2.00000 | 1.487490 | 70.2 |
| 7 | 308.39105 | 3.99595 | 1.806098 | 40.9 |
| 8 | −98.30156 | | | |
| 9 | 78.37942 | 5.41638 | 1.743997 | 44.8 |
| 10 | −156.36404 | | | |
| 11 | −52.16042 | 1.80000 | 1.603420 | 38.0 |
| 12 | −105.81527 | 0.15000 | | |
| 13 | 78.79464 | 4.54077 | 1.696797 | 55.5 |
| 14 | −91.03803 | 16.53688 | | |
| stop15 | 0.00000 | 0.15000 | | |
| 16 | 0.00000 | | | |
| 17 | −29.55494 | 1.45000 | 1.761821 | 26.5 |
| 18 | 829.73514 | | | |
| 19 | −261.62439 | 1.50000 | 1.834000 | 37.2 |
| 20 | 37.00486 | 5.61047 | 1.487490 | 70.2 |
| 21 | −79.86380 | 0.15000 | | |
| 22 | 125.30129 | 8.43188 | 1.487490 | 70.2 |
| 23 | −27.56192 | 0.27167 | | |
| 24 | −122.05333 | 4.14527 | 1.529960 | 55.8 |
| 25 | −69.67200 | | | |
| 26 | 84.86774 | 3.94401 | 1.805181 | 25.4 |
| 27 | −459.60224 | 1.45000 | | |
| 28 | 0.00000 | 55.00000 | 1.841390 | 24.6 |
| 29 | 0.00000 | 0.00000 | | |
| 30 | 0.00000 | 3.80000 | 1.516330 | 64.1 |
| 31 | 0.00000 | 8.63372 | | |

Aspherical Data

| | 1/r | K | A | B | C | D | E |
|---|---|---|---|---|---|---|---|
| 3 | 3.83805E−02 | −7.85687E−01 | −2.48521E−05 | 6.85947E−08 | −1.51888E−10 | 2.16220E−13 | −1.40912E−16 |
| 4 | 5.71429E−02 | −2.49021E+00 | 5.75060E−06 | 6.82075E−09 | −5.36186E−11 | 1.04189E−13 | −1.02043E−16 |
| 24 | −8.19314E−03 | −6.89870E+01 | −2.02602E−05 | −3.25181E−08 | 8.00340E−11 | −1.81918E−13 | −3.05930E−16 |
| 25 | −1.43530E−02 | −1.30502E+01 | −1.86936E−05 | −2.68600E−08 | 5.45865E−11 | −1.09738E−13 | −1.77584E−16 |

Interval Data

| | d8 | d10 | d16 | d18 | d25 |
|---|---|---|---|---|---|
| Wide | 24.07528 | 39.74834 | 1.91562 | 2.97765 | 0.90000 |
| Tele | 1.60000 | 2.90468 | 25.85108 | 1.54845 | 37.71089 |

This application claims priorities from Japanese Patent Application Nos. 2004-067442 filed on Mar. 10, 2004, and 2004-076473 filed on Mar. 17, 2004, those are hereby incorporated by reference herein.

What is claimed is:

1. A projection lens comprising:
a plurality of plastic lenses containing plastic,
wherein when a focal distance of an i-th positive lens from a predetermined plane side of N positive lenses of the plurality of plastic lenses is given by fpi,
a focal distance of a j-th negative lens from the predetermined plane side of M negative lenses of the plurality of plastic lenses is given by fnj, and
fp and fn are defined by $$\frac{1}{fp} = \sum_{i=1}^{N} \frac{1}{fpi}$$

$$\frac{1}{fn} = \sum_{j=1}^{M} \frac{1}{fnj}$$

(N and M each are a natural number, that is, an integer equal to or larger than 1), $-0.56 < fn/fp < -0.05$ is satisfied,
wherein 50% or more of a volume of each of the plastic lenses at 20 degrees centigrade is made of plastic.

2. A projection lens according to claim 1, wherein the number of plastic lenses which are included in the zoom lens and contain plastic is (N+M).

3. A projection lens according to claim 1, further comprising:
a plurality of moving lens units that move on an optical axis of the projection lens for zooming.

4. A projection lens according to claim 1, wherein at least one lens of the N positive lenses and the M negative lenses comprises an aspherical lens.

5. A projection lens according to claim 1, wherein each of the N positive lenses and the M negative lenses comprises an aspherical lens.

6. A projection lens according to claim 1, wherein the projection lens comprises a first lens unit having negative refracting power, a second lens unit which is one of the plurality of moving lens units and has positive refracting power, a third lens unit which is one of the plurality of moving lens units and has positive refracting power, a fourth lens unit which is one of the plurality of moving lens units and has negative refracting power, a fifth lens unit which is one of the plurality of moving lens units and has positive refracting power, and a sixth lens unit having positive refracting power, which are disposed in order from a magnifying conjugate side (front) to a reducing conjugate side (rear), and
wherein an interval between the first lens unit and the second lens unit, an interval between the second lens unit and the third lens unit, an interval between the third lens unit and the fourth lens unit, an interval between the fourth lens unit and the fifth lens unit, and an interval between the fifth lens unit and the sixth lens unit change in accordance with zooming,
wherein the first lens unit and the sixth lens unit are not moved for zooming.

7. A projection lens according to claim 6, wherein at least one of the N positive lenses is included in the fifth lens unit.

8. A projection lens according to claim 1, wherein the projection lens comprises a first lens unit having negative refracting power, a second lens unit which is one of the plurality of moving lens units and has positive refracting power, a third lens unit which is one of the plurality of moving lens units and has positive refracting power, a fourth lens unit which is one of the plurality of moving lens units and has positive refracting power, and a fifth lens unit having positive refracting power, which are disposed in order from a magnifying conjugate side (front) to a reducing conjugate side (rear), and
wherein the first lens unit and the fifth lens unit are not moved for zooming.

9. A projection lens according to claim 8, wherein at least one of the N positive lenses is included in the fourth lens unit.

10. A projection lens according to claim 1, wherein at least one of the M negative lenses is disposed in a lens unit closest to the predetermined plane.

11. A projection lens according to claim 1, wherein when a focal distance of an entire system of the projection lens in a zoom position at a wide angle end is given by fw, $-7 < fn/fw < -1$ is satisfied.

12. A projection lens according to claim 1, wherein a lens unit disposed closest to a magnifying conjugate side includes a plurality of lenses, each of which has negative refracting power, and
of the plurality of lenses, a lens closest to a reducing conjugate side has a meniscus shape in which a surface of the lens on the reducing conjugate side is convex.

13. A projection lens according to claim 1, wherein when an average value of Abbe numbers of materials of negative lenses in a lens unit closest to a magnifying conjugate side is given by v1n, $47 < v1n$ is satisfied.

14. A projection lens according to claim 1, wherein $-0.52 < fn/fp < -0.05$ is satisfied.

15. A projection lens according to claim 1, wherein $-0.56 < fn/fp < -0.12$ is satisfied.

16. A projection lens according to claim 1, wherein when a focal distance of the projection lens at a wide angle end is given by fw and an air conversion length of a back focus is given by bf, $0.25 < fw/bf < 0.60$ is satisfied.

17. An image display apparatus, comprising:
a plurality of image display devices;
an illumination optical system for illuminating the plurality of image display devices with light from a light source;
a color composition system for synthesizing light beams from the plurality of image display devices; and
the projection lens for projecting light from the color composition system onto the predetermined plane, according to claim 1.

18. An image display apparatus according to claim 17, wherein
the plurality of image display devices disposed on a reducing conjugate side of the zoom lens are substantially conjugate with a predetermined surface disposed on a magnifying conjugate side of the projection lens.

19. An optical device, comprising
the projection lens according to claim 1.

20. A projection lens comprising:
a plurality of plastic lenses containing plastic,
wherein when a focal distance of an i-th positive lens from a predetermined plane side of N positive lenses of the plurality of plastic lenses is given by fpi,
a focal distance of a j-th negative lens from the predetermined plane side of M negative lenses of the plurality of plastic lenses is given by fnj, and fp and fn are defined by $$\frac{1}{fp} = \sum_{i=1}^{N} \frac{1}{fpi}$$

$$\frac{1}{fn} = \sum_{j=1}^{M} \frac{1}{fnj}$$

(N and M each are a natural number, that is, an integer equal to or larger than 1), $-0.56 < fn/fp < -0.05$ is satisfied,
wherein the projection lens comprises a first lens unit having negative refracting power, a second lens unit which is one of the plurality of moving lens units and has positive refracting power, a third lens unit which is one of the plurality of moving lens units and has positive refracting power, a fourth lens unit which is one of the plurality of moving lens units and has negative refracting power, a fifth lens unit which is one of the plurality of moving lens units and has positive refracting power, and a sixth lens unit having positive refracting power, which are disposed in order from a magnifying conjugate side (front) to a reducing conjugate side (rear), and
wherein an interval between the first lens unit and the second lens unit, an interval between the second lens unit and the third lens unit, an interval between the third lens unit and the fourth lens unit, an interval between the fourth lens unit and the fifth lens unit, and an interval between the fifth lens unit and the sixth lens unit change in accordance with zooming, wherein the first lens unit and the sixth lens unit are not moved for zooming.

21. An image display apparatus, comprising:
a plurality of image display devices;
an illumination optical system for illuminating the plurality of image display devices with light from a light source;
a color composition system for synthesizing light beams from the plurality of image display devices; and
the projection lens for projecting light from the color composition system onto the predetermined plane, according to claim 20.

22. A projection lens comprising:
a plurality of plastic lenses containing plastic,
wherein when a focal distance of an i-th positive lens from a predetermined plane side of N positive lenses of the plurality of plastic lenses is given by fpi,
a focal distance of a j-th negative lens from the predetermined plane side of M negative lenses of the plurality of plastic lenses is given by fnj, and
fp and fn are defined by $$\frac{1}{fp} = \sum_{i=1}^{N} \frac{1}{fpi}$$

$$\frac{1}{fn} = \sum_{j=1}^{M} \frac{1}{fnj}$$

(N and M each are a natural number, that is, an integer equal to or larger than 1), $-0.56 < fn/fp < -0.05$ is satisfied,
wherein the projection lens comprises a first lens unit having negative refracting power, a second lens unit which is one of the plurality of moving lens units and has positive refracting power, a third lens unit which is one of the plurality of moving lens units and has positive refracting power, a fourth lens unit which is one of the plurality of moving lens units and has positive refracting power, and a fifth lens unit having positive refracting power, which are disposed in order from a magnifying conjugate side (front) to a reducing conjugate side (rear), and
wherein the first lens unit and the fifth lens unit are not moved for zooming.

23. An image display apparatus, comprising:
a plurality of image display devices;
an illumination optical system for illuminating the plurality of image display devices with light from a light source;
a color composition system for synthesizing light beams from the plurality of image display devices; and
the projection lens for projecting light from the color composition system onto the predetermined plane, according to claim 22.

24. A projection lens comprising:
a plurality of plastic lenses containing plastic,
wherein when a focal distance of an i-th positive lens from a predetermined plane side of N positive lenses of the plurality of plastic lenses is given by fpi,
a focal distance of a j-th negative lens from the predetermined plane side of M negative lenses of the plurality of plastic lenses is given by fnj, and
fp and fn are defined by $$\frac{1}{fp} = \sum_{i=1}^{N} \frac{1}{fpi}$$

$$\frac{1}{fn} = \sum_{j=1}^{M} \frac{1}{fnj}$$

(N and M each are a natural number, that is, an integer equal to or larger than 1), $-0.56 < fn/fp < -0.05$ is satisfied,
wherein when a focal distance of an entire system of the projection lens in a zoom position at a wide angle end is given by fw, $-7 < fn/fw < -1$ is satisfied.

25. An image display apparatus, comprising:
a plurality of image display devices;
an illumination optical system for illuminating the plurality of image display devices with light from a light source;
a color composition system for synthesizing light beams from the plurality of image display devices; and
the projection lens for projecting light from the color composition system onto the predetermined plane, according to claim 24.

26. A projection lens comprising:
a plurality of plastic lenses containing plastic,
wherein when a focal distance of an i-th positive lens from a predetermined plane side of N positive lenses of the plurality of plastic lenses is given by fpi, a focal distance of a j-th negative lens from the predetermined plane side of M negative lenses of the plurality of plastic lenses is given by fnj, and fp and fn are defined by $$\frac{1}{fp} = \sum_{i=1}^{N} \frac{1}{fpi}$$

$$\frac{1}{fn} = \sum_{j=1}^{M} \frac{1}{fnj}$$

(N and M each are a natural number, that is, an integer equal to or larger than 1), $-0.56 < fn/fp < -0.05$ is satisfied, wherein a lens unit disposed closest to a magnifying conjugate side includes a plurality of lenses, each of which has negative refracting power, and of the plurality of lenses, a lens closest to a reducing conjugate side has a meniscus shape in which a surface of the lens on the reducing conjugate side is convex.

27. An image display apparatus, comprising:
a plurality of image display devices;
an illumination optical system for illuminating the plurality of image display devices with light from a light source;
a color composition system for synthesizing light beams from the plurality of image display devices; and
the projection lens for projecting light from the color composition system onto the predetermined plane, according to claim 26.

28. A projection lens comprising:
a plurality of plastic lenses containing plastic,
wherein when a focal distance of an i-th positive lens from a predetermined plane side of N positive lenses of the plurality of plastic lenses is given by fpi,
a focal distance of a j-th negative lens from the predetermined plane side of M negative lenses of the plurality of plastic lenses is given by fnj, and
fp and fn are defined by $$\frac{1}{fp} = \sum_{i=1}^{N} \frac{1}{fpi}$$

$$\frac{1}{fn} = \sum_{j=1}^{M} \frac{1}{fnj}$$

(N and M each are a natural number, that is, an integer equal to or larger than 1), $-0.56 < fn/fp < -0.05$ is satisfied, wherein when an average value of Abbe numbers of materials of negative lenses in a lens unit closest to a magnifying conjugate side is given by v1n, $47 < v1n$ is satisfied.

29. An image display apparatus, comprising:
a plurality of image display devices;
an illumination optical system for illuminating the plurality of image display devices with light from a light source;
a color composition system for synthesizing light beams from the plurality of image display devices; and
the projection lens for projecting light from the color composition system onto the predetermined plane, according to claim 28.

30. A projection lens comprising:
a plurality of plastic lenses containing plastic,
wherein when a focal distance of an i-th positive lens from a predetermined plane side of N positive lenses of the plurality of plastic lenses is given by fpi,
a focal distance of a j-th negative lens from the predetermined plane side of M negative lenses of the plurality of plastic lenses is given by fnj, and
fp and fn are defined by $$\frac{1}{fp} = \sum_{i=1}^{N} \frac{1}{fpi}$$

$$\frac{1}{fn} = \sum_{j=1}^{M} \frac{1}{fnj}$$

(N and M each are a natural number, that is, an integer equal to or larger than 1), $-0.56 < fn/fp < -0.05$ is satisfied, wherein when a focal distance of the projection lens at a wide angle end is given by fw and an air conversion length of a back focus is given by bf, $0.25 < fw/bf < 0.60$ is satisfied.

31. An image display apparatus, comprising:
a plurality of image display devices;
an illumination optical system for illuminating the plurality of image display devices with light from a light source;
a color composition system for synthesizing light beams from the plurality of image display devices; and
the projection lens for projecting light from the color composition system onto the predetermined plane, according to claim 30.

32. An image display apparatus, comprising:
a plurality of image display devices;
an illumination optical system for illuminating the plurality of image display devices with light from a light source;
a color composition system for synthesizing light beams from the plurality of image display devices; and
a projection lens for projecting light from the color composition system onto the predetermined plane, said projection lens comprising:
a plurality of plastic lenses containing plastic,
wherein when a focal distance of an i-th positive lens from a predetermined plane side of N positive lenses of the plurality of plastic lenses is given by fpi,
a focal distance of a j-th negative lens from the predetermined plane side of M negative lenses of the plurality of plastic lenses is given by fnj, and
fp and fn are defined by $$\frac{1}{fp} = \sum_{i=1}^{N} \frac{1}{fpi}$$

-continued $$\frac{1}{fn} = \sum_{j=1}^{M} \frac{1}{fnj}$$

(N and M each are a natural number, that is, an integer equal to or larger than 1), $-0.56 < fn/fp < -0.05$ is satisfied.

* * * * *